(12) United States Patent
Nobuhara et al.

(10) Patent No.: US 6,713,564 B1
(45) Date of Patent: Mar. 30, 2004

(54) STAR BLOCK COPOLYMER

(75) Inventors: Yukikazu Nobuhara, Chiba (JP); Hitoshi Matsumoto, Chiba (JP); Nakamura Mitsuhiro, Chiba (JP); Asami Kobayashi, Chiba (JP)

(73) Assignee: Nippon Soda Co. Ltd., Tokyo (JP)

( * ) Notice: Subject to any disclaimer, the term of this patent is extended or adjusted under 35 U.S.C. 154(b) by 0 days.

(21) Appl. No.: 10/070,267

(22) PCT Filed: Aug. 31, 2000

(86) PCT No.: PCT/JP00/05919

§ 371 (c)(1),
(2), (4) Date: Feb. 26, 2002

(87) PCT Pub. No.: WO01/16198

PCT Pub. Date: Mar. 8, 2001

(30) Foreign Application Priority Data

Aug. 31, 1999 (JP) ............................................. 11-246256

(51) Int. Cl.[7] ............................ C08F 297/02; C08F 8/00
(52) U.S. Cl. .................... 525/328.9; 525/271; 525/291; 525/293; 525/294; 525/299; 525/326.5; 525/328.5; 526/313
(58) Field of Search ............................... 525/271, 328.9, 525/291, 293, 294, 299, 326.5, 328.5; 526/131

(56) References Cited

U.S. PATENT DOCUMENTS

| | | |
|---|---|---|
| 5,102,966 A | 4/1992 | Higashimura et al. |
| 5,798,418 A | 8/1998 | Quirk |
| 6,218,485 B1 * | 4/2001 | Muramoto et al. ........... 526/87 |

FOREIGN PATENT DOCUMENTS

| | | |
|---|---|---|
| DE | 37 35403 A1 | 5/1989 |
| DE | 691 00 978 T2 | 8/1994 |
| EP | 0 312 928 A1 | 4/1989 |
| EP | 0 464 408 A1 | 1/1992 |
| JP | 1-141906 | 2/1989 |
| JP | 4-363306 | 12/1992 |
| JP | 6-239944 | 8/1994 |
| WO | WO 97/05179 | 2/1997 |

* cited by examiner

Primary Examiner—Fred Teskin
(74) Attorney, Agent, or Firm—Dennis G. LaPointe; Mason Law, P.A.

(57) ABSTRACT

A novel star block copolymer which can be made to have a high molecular weight and gives a solution having a lower viscosity than solutions of linear polymers having the same molecular weight as the copolymer and which is expected to be used as a resist material; and a process for producing the copolymer. The star block copolymer having alkenylphenol skeletons is obtained by homopolymerizing by living anion polymerization an alkenylphenol compound in which the hydroxyl group of the phenol moiety has been protected by a saturated aliphatic protective group or copolymerizing the alkenylphenol compound with a vinylaromatic compound by living anion polymerization, subsequently copolymerizing the resultant polymer using a polyfunctional coupling agent such as divinylbenzene to obtain a star block copolymer, and eliminating the saturated aliphatic protective groups with an acid reagent.

49 Claims, No Drawings

STAR BLOCK COPOLYMER

RELATED APPLICATION

This application claims the benefit of International Application PCT/JP00/05919 filed Aug. 31, 2000 and which published in the Japanese language with an English abstract only as WO 01/16198 on Aug. 3, 2001.

TECHNICAL FIELD

The present invention relates to a star block copolymer with an arm moiety having an alkenylphenol homopolymer or copolymer as polymer chains and a process for producing the same. The star block copolymer of the present invention is a compound anticipated to be utilized as a resist material for excimer lasers and electron beams.

BACKGROUND ART

Alkenylphenol homopolymers and copolymers of which poly-p-hydroxystyrene is a representative are useful as resist materials for excimer lasers of chemical amplification. Among them, resists using a poly-(p-hydroxystyrene) or (p-hydroxystyrene/styrene) copolymer are known as resists capable of imaging with high resolution.

In regards to star block copolymers, for example, in Japanese Unexamined Patent Publication No. 222114 of 1993, a star polymer has been described in which a block copolymer molecule is produced by anionic polymerization of isoprene and styrene, coupled with a polyalkenyl coupling agent at 2.5 moles or more per 1 mole of the block copolymer molecule, and further 95% or more of isoprene units (olefin unsaturated) and less than 15% of styrene units (aromatic unsaturated) are selectively hydrogenated.

Japanese Unexamined Patent Publication No. 220203 of 1994 has described a modified block copolymer comprising a core crosslinking with a polyfunctional coupling agent, and comprising at least one type of polymer block induced from unsaturated carboxylate ester of alkyl, and at least one type of polymer block induced from conjugated diene and/or at least one type of a polymer block induced from monovinyl aromatic compound.

Japanese Unexamined Patent Publication No. 256436 of 1994 has described a polymer comprising at least three first arms with peak molecular weight of from 10,000 to 200,000 comprising hydrogenated polymerization conjugated diene; at least three second arms with peak molecular weight of from 500 to 10,000 comprising polymerized methacrylate and/or an amido or imide derivative thereof; and a central core connecting the first arms and second arms in a star configuration and comprising polymerized bis unsaturated monomer.

Japanese Unexamined Patent Publication No. 97413 of 1995 has described a star block polymer having the general formula:

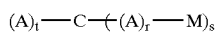

wherein C is a block of crosslinked bis unsaturated monomer; each A is independently a block of anionic polymerization monomer; M is a block of polymerization methacrylic acid alkyl polymerized through ethylene unsaturation of methacrylic acid moiety; r is 0 or 1; and s and t are an average of 2 or more but $s \leq t$ wherein the molecular weight of from 20,000 to 2,000,000 and A is styrene or isoprene.

Japanese Unexamined Patent Publication No. 48987 of 1996 has described a star polymer having the structure represented by (EP'-S-EP") n-X wherein EP' is a first hydrogenated block of polyisoprene (I') with the number average molecular weight (Mn) before hydrogenation of from 10,000 to 100,000, S is polystyrene block with the average molecular weight (Mn) of from 6,000 to 50,000, EP" is a second hydrogenated block of polyisoprene (I") with the number average molecular weight (Mn) before hydrogenation of from 2,500 to 50,000, a molecular ratio of I'/I" is at least 1.4, X is a core consisting of a polyalkenyl coupling agent, and n is an average arm number per star molecule formed by reacting the polyalkenyl coupling agent at 2 moles or more for one mole of (EP'-S-EP"), wherein the star polymer consists of an intramolecular bound polystyrene block and hydrogenated polyisoprene block and is useful as an improver of the viscosity index (VI).

Japanese Unexamined Patent Publication No. 81514 of 1996 has described a polyfunctional initiator of anionic polymerization, which is soluble in non-polar solvents, not containing (or substantially not containing) any residual double bond and represented by the general formula, $(PA)_a N^{r-} nLi^+$ wherein PA represents a polymer block generated from at least one type of monomer A selected from vinyl aromatic monomers and diene monomers; a represents a number of arms of PA block, from 3 to 30, especially from 3 to 15; N represents a crosslinked core not containing or substantially not containing any residual double bond and has the formula, (PMc) (RLi) p wherein Mc is a monomer containing at least two polymerized double bonds per molecule; PMc is a crosslinked core of at least one type of polymerization monomer Mc containing from 3 to 30% residual double bonds for initial double bonds derived from monomer Mc; R is an alkyl group and the like having straight or branched chains; and p is a number of residual double bonds in PMc neutralized with RLi; n is a number of anion sites present in the crosslinked PMc core and equal to a+p (or p) (p has the above meanings, and a is a number of anion sites present in the crosslinked core before addition of RLi.)

Japanese Patent Publication No. 504865 of 1996 has described a star block copolymer comprising (a) at least three arms from at least one anion polymerized monomer selected from the group consisting of monovinyl aromatic hydrocarbon, conjugated diene and the mixtures thereof, (b) at least three arms comprising polydimethyl siloxane and (c) a core comprising a polyalkenyl aromatic coupling agent (the above (a) and (b) radiate out from this core).

Published Japanese Translation of PCT International Publication for Patent Applications No. 505179 of 1996 has described a block copolymer of the general formula (A-B) n(B) mX wherein A is a block of polystyrene having peak molecular weight of less than 15,000, B is a polymer block of hydrogenated conjugated diene having peak molecular weight ranging from 15,000 to 50,000, X is a block of divinylbenzene, and n and m are integers of 0 or more wherein a sum of n and m is at least 10.

Published Japanese Translation of PCT International Publication for Patent Applications No. 510236 of 1997 has described a star copolymer containing (a) four molecules or more of polyfunctional binders forming a core selected from the group consisting of divinyl aromatic compound, trivinyl aromatic compound, diepoxide, diketone, and aldehyde; and (b) three or more of cation polymer branches bound to said core wherein said polymer branch is selected from the group consisting of a homopolymer, copolymer and block copolymer having at least one polyolefin segment and at least one polyaryl segment, and a graft copolymer.

DISCLOSURE OF THE INVENTION

Polymers with higher molecular weights have been conventionally known to be more preferable as base polymers for positive resist materials in terms of resolution, heat resistance and the like. However, when a molecular structure of a base polymer is accompanied with high molecular weight as a conventional linear structure, it has been problematic in that resist viscosity is increased resulting in difficulty of spin coating though resist application on substrates is usually performed by spin coating.

Among the star block copolymers described above, those having a hydroxystyrene skeleton at an arm moiety have not been known.

The subject of the present invention is to provide a novel star block copolymer which can be made to have a high molecular weight as a solution and has a lower viscosity than solutions of linear polymers having the same molecular weight as the copolymer and which is expected to be used as a resist material; and a process for producing the copolymer.

As results of an intensive study to achieve said subject, the present inventors have found that the star block copolymer with a narrow molecular weight range having alkenylphenol skeletons of which structure is controlled is obtained by homopolymerizing by living anionic polymerization an alkenylphenol compound in which the hydroxyl group of the phenol moiety has been protected by protective groups or copolymerizing the alkenylphenol compound with a vinylaromatic compound, subsequently copolymerizing the resultant polymer using a polyvinyl compound to obtain a star block copolymer, and eliminating phenol hydroxyl protective groups with an acid reagent, and then completing the present invention based on these findings.

That is, the present invention relates to the star block copolymer described in any of the following (1) through (19):

(1) the star block copolymer characterized by having an arm moiety comprising a central core and a polymer chain radiated out from the central core, wherein the arm moiety (A) comprises the polymer chain (A1) having a repeated unit represented by the general formula (I):

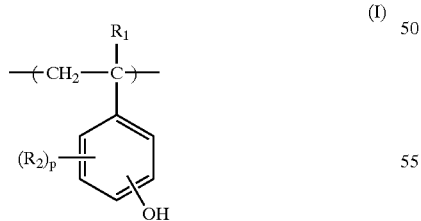

wherein $R_1$ represents a hydrogen atom or a methyl group; $R_2$ represents a hydrogen atom or a C1–C6 alkyl group; and p represents 1 or 2 wherein $R_2$ may be identical or different when p is 2;

(2) the star block copolymer according to (1) characterized in that the polymer chain (A1) is a copolymer having repeated units represented by the general formula (I) and (II):

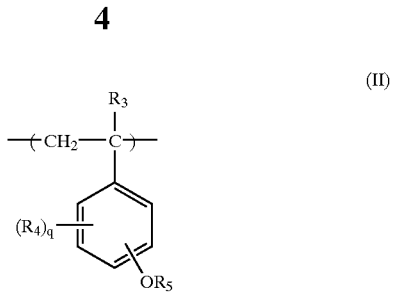

wherein $R_3$ represents a hydrogen atom or a methyl group; $R_4$ represents a hydrogen atom or a C1–C6 alkyl group; $R_5$ represents an acidolytic/leaving group; q represents 1 or 2 wherein $R_4$ may be identical or different when q is 2;

(3) the star block copolymer according to (1) characterized in that the polymer chain (A1) is a copolymer having repeated units represented by the general formula (I) and (III):

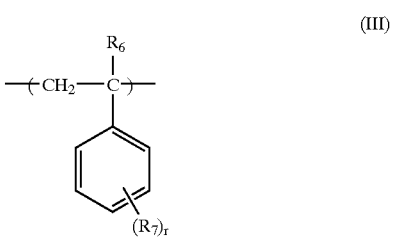

wherein $R_6$ represents a hydrogen atom, a methyl group, or an aryl group which may have substituents; $R_7$ represents a hydrogen atom or a C1–C6 alkyl group; r represents 1 or 2 wherein $R_7$ may be identical or different when r is 2;

(4) the star block copolymer according to (1) through (3) characterized in that the polymer chain (A1) have repeated units represented in the general formula (I), (II) and (III) wherein $R_3$, $R_4$, $R_5$, and q are the same as mentioned above;

(5) the star block copolymer according to any of (1) through (4) characterized in that the arm moiety (A) has the polymer chain (A1) and a polymer chain (A2) having a repeated unit (A21) represented by the general formula (IV):

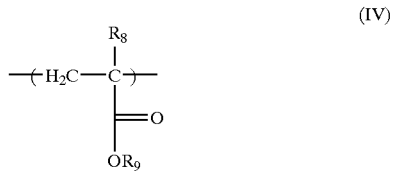

wherein $R_8$ represents a hydrogen atom or a methyl group; $R_9$ represents a hydrogen atom, a C1–C12 alkyl group, a hydrocarbon group having C3 or more alicyclic skeletons which may have substituents, an alkyl group having hydrocarbon groups having the alicyclic skeletons, or a heterocyclic group;

(6) the star block copolymer according to (5) characterized in that the polymer chain (A2) has the repeated unit (A21) represented by the general formula (IV) and a repeated unit (A22) represented by the general formula (V):

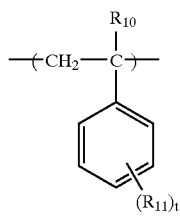

(V)

wherein $R_{10}$ represents a hydrogen atom, a methyl group, or an aryl group which may have substituents; $R_{11}$ represents a hydrogen atom, a C1–C6 alkyl group, $OR_{12}$ group wherein $R_{12}$ represents a hydrogen atom, a C1–C6 alkyl group, or acidolytic/leaving group; t represents an integer of 0 or any of 1 through 3 wherein $R_{11}$ may be identical or different when t is 2 or more.

(7) the star block copolymer according to (6) characterized in that the polymer chain (A2) is a block copolymerized by (A22) through (A21) sequentially from the central core;

(8) the star block copolymer according to any of (1) through (7) characterized in that the number average molecular weight of the polymer chains composing the arm moiety is in the range of from 1,000 to 100,000 and a ratio (Mw/Mn) of the weight average molecular weight (Mw) to the number average molecular weight (Mn) is in the range of from 1.00 to 1.50;

(9) the star block copolymer according to any of (1) through (8) characterized in that the central core is the core crosslinked with a polyfunctional coupling agent;

(10) the star block copolymer according to (9) characterized in that the polyfunctional coupling agent is the compound having at least two polymerization double bonds per molecule;

(11) the star block copolymer according to (9) or (10) characterized in that the polyfunctional coupling agent is the compound represented by the general formula (VI):

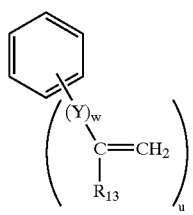

(VI)

wherein $R_{13}$ represents a hydrogen atom or a methyl group; Y represents an oxygen atom, a sulfur atom, $R_{16}R_{17}N$ wherein $R_{16}$ and $R_{17}$ each independently represent hydrogen atoms, C1–C6 alkyl groups or alkoxycarbonyl groups, a methylene group which may have substituents, a phenylene group which may have substituents, $C(R_{18}R_{19})O$, $C(R_{18}R_{19})S$, $C(R_{18}R_{19})N(R_{20})$, $OC(R_{18}R_{19})$, $SC(R_{18}R_{19})$, $N(R_{20})C(R_{18}R_{19})$ (wherein $R_{18}$, $R_{19}$ and $R_{20}$ represent C1–C6 alkyl groups, or phenyl groups which may have substituents), OCO, or $CO_2CH_2$; w represents an integer of 0 or 1 to 2 wherein Y may be identical or different when w is 2; and u represents 2 or 3 wherein Y, $R_{13}$ and w may be identical or different;

(12) the star block copolymer according to any of (1) through (11) characterized in that the number average molecular weight is from 3,000 to 300,000;

(13) the star block copolymer according to any of (1) through (12) characterized in that the ratio (Mw/Mn) of the weight average molecular weight (Mw) to the number average molecular weight (Mn) is in the range of from 1.00 to 1.50; and

(14) the process for producing the star block copolymer according to any of (1) through (13) characterized in that by an anionic polymerization method using an anionic polymerization initiator as a polymerization initiator, the compound represented by the general formula (VII):

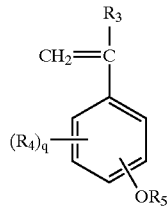

(VII)

wherein $R_3$, $R_4$, $R_5$ and q are the same as mentioned above, is homopolymerized or copolymerized with the compound capable of copolymerizing the compound represented by the general formula (VII), subsequently the polyfunctional coupling agent (C) is copolymerized and the protective groups of phenol hydroxyl groups are eliminated;

(15) the process for producing the star block copolymer according to any of (1) through (13) characterized in that by an anionic polymerization method using an anionic polymerization initiator as a polymerization initiator, the compound represented by the general formula (VII) wherein $R_3$, $R_4$, $R_5$ and q are the same as mentioned above, is homopolymerized or copolymerized with the compound capable of copolymerizing the compound represented by the general formula (VII), subsequently copolymerized with the polyfunctional coupling agent (C), further copolymerized with the compound capable of anion polymerizing, and then the protective groups of phenol hydroxyl groups are eliminated;

(16) the process producing the star block copolymer according to (14) or (15) characterized in that a molar ratio [(C)/(D)] of the polyfunctional coupling agent (C) to an active end of the polymer chain homopolymerizing the compound represented by the general formula (VII) or an active end (D) of the polymer chain copolymerizing the compound capable of copolymerizing with the compound represented by the general formula (VII) by the anionic polymerization method using the anionic polymerization initiator as the polymerization initiator, is from 1.0 to 10;

(17) the process for producing the star block copolymer according to any of (14) through (16) characterized in that the polyfunctional coupling agent is a compound represented by the general formula (VI):

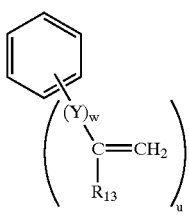

(VI)

wherein Y, $R_{12}$, $R_{13}$, w and u are the same as mentioned above;

(18) the process for producing the star block copolymer according to any of (14) through (17) characterized in that the compound capable of copolymerizing with the compound represented by the general formula (VII) is a compound represented by the general formula (IX):

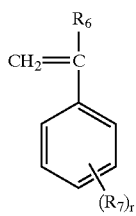

(VIII)

wherein $R_6$, $R_7$, and r are the same as mentioned above; and

(19) the process for producing the star block copolymer according to any of (15) through (17) characterized in that the compound capable of anion polymerizing is a compound represented by the general formula (IX):

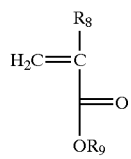

(IX)

wherein $R_8$ and $R_9$ are the same as mentioned above.

The star block copolymer of the present invention is not limited so long as the polymer chain comprises the polymer chain (A1) having the repeated unit represented by the general formula (I) in the arm moiety (A) in the star block copolymer having an arm moiety comprising a central core and a polymer chain radiated out from the central core, wherein in the repeated unit represented by the general formula (I), $R_1$ represents a hydrogen atom or a methyl group; $R_2$ represents a hydrogen atom or C1 through C6 alkyl group wherein, specifically, methyl group, ethyl, isopropyl and t-butyl groups can be exemplified; p represents 1 or 2 wherein $R_2$ may be identical or different when p is 2 wherein substituted sites of $R_2$ and the hydroxyl group (OH-group) are not especially limited but the hydroxyl group is preferably substituted at the para- or meta- position of an alkenyl group.

The above polymer (A1) chain is preferably copolymer having the repeated unit represented by the general formula (I) and the repeated unit represented by the general formula (II). The molar ratio of the repeated unit represented by the general formula (I) to the repeated unit represented by the general formula (II) in this polymer chain (A1) is not specifically limited but the ratio [general formula (I)/general formula (II)] is in the range of from 99/1 to 50/50, and preferably from 95/5 to 60/40. In the repeated unit represented by the above general formula (II), $R_3$ represents a hydrogen atom, a methyl group or an aryl group which may have substituents. Specifically, phenyl, p-tolyl, 4-methoxyphenyl groups and the like can be exemplified. Also, $R_4$ represents a hydrogen atom or a C1 through C6 alkyl group. Specifically, methyl, ethyl, isopropyl, t-butyl groups and the like can be exemplified. The letter, q represents 1 or 2 wherein $R_4$ may be identical or different when q is 2. The substituted sites of $R_4$ and the alkoxy group ($OR_5$-group) are not specifically limited but the alkoxy group is preferably substituted at the para- or meta- position of alkenyl group.

$R_5$ represents an acidolytic/leaving group. Acidolytic/leaving groups herein mean the groups which leave or decompose by acids. Specifically, methoxymethyl, 2-methoxyethoxymethyl, bis(2-chloroethoxy)methyl, tetrahydropyranyl, 4-methoxy tetrahydropyranyl, tetrahydrofuranyl, triphenylmethyl, trimethylsilyl, 2-(trimethylsilyl) ethoxymethyl, t-butylmethylsilyl, trimethylsilylmethyl, t-butyl, t-butoxycarbonyl, t-butoxycarbonylmethyl, 2-methyl-2-t-butoxycarbonylmethyl groups and the like can be exemplified. Furthermore, as $R_5$, the groups represented by the following formula:

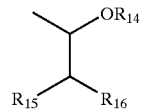

wherein $R_{14}$ represents the C1 through C20 alkyl group unsubstituted or substituted with alkoxy, C5 through C10 cycloalkyl group, or C6 through C20 aryl group unsubstituted or substituted with alkoxy; $R_{15}$ represents a hydrogen atom or C1 through C3 alkyl group; and $R_{16}$ represents C1 through C6 alkyl group or C1 through C6 alkoxy group. As such substituents, specifically, 1-methoxyethyl, 1-ethoxyethyl, 1-methoxypropyl, 1-methyl-1-methoxyethyl, 1-(isopropoxy)ethyl groups and the like can be exemplified.

Also, the above polymer chain (A1) is preferably a copolymer having the repeated unit represented by the general formula (I) and the repeated unit represented by the general formula (III). In the repeated unit represented by the formula (III), $R_6$ represents a hydrogen atom or a methyl group; $R_7$ represents a hydrogen atom or C1 through C6 alkyl group, specifically methyl, ethyl, isopropyl, t-butyl groups and the like can be exemplified; and r represents 1 or 2 wherein $R_7$ may be identical or different when r is 2 wherein the substituted site is not especially limited. The molar ratio of the repeated unit represented by the general formula (I) to the repeated unit represented by the general formula (III) in this polymer chain (A1) is not especially limited but the ratio [general formula (I)/general formula (III)] is preferably in the range of from 99/1 to 50/50.

Additionally, the above polymer chain (A1) is preferably a copolymer having the repeated units represented by the general formulae (I), (II) and (III). The molar ratio of the repeated units in this polymer chain (A1) is not especially limited but the molar ratio [general formula (I)/general formula (II)+general formula (III)] is preferably in the range of from 99/1 to 50/50.

The above arm moiety (A) preferably has the polymer chain (A2) having the polymer chain (A1) and the repeated unit (A21) represented by the general formula (IV). In the repeated unit represented by the general formula (IV), $R_8$ represents a hydrogen atom or a methyl group. $R_9$ represents a hydrogen atom, C1 through C12 alkyl group, a hydrocarbon group having alicyclic skeletons of C3 or more which may have substituents (but, do not include a carbon of substituents in carbon number), an alkyl group having hydrocarbon groups having the alicyclic skeletons, or heterocyclic group wherein acidolytic/leaving group is preferable, and the group having t-butyl groups which can be left/decomposed by acids is more preferable. Acidolytic/leaving groups herein mean the groups which decompose and/or leave by acids.

As the above $R_9$, specifically, methyl, ethyl, n-propyl, isopropyl, n-butyl, t-butyl, methoxymethyl, 2-methoxyethoxymethyl, bis(2-chloroethoxy)methyl, tetrahydropyranyl, 4-methoxytetrahydropyranyl, tetrahydrofuranyl, triphenylmethyl, trimethylsilyl, 2-(trimethylsilyl)ethoxymethyl, t-butyldimethylsilyl, trimethylsilylmethyl and the functional groups represented by the following formulae wherein u represents 0 or 1 can be exemplified.

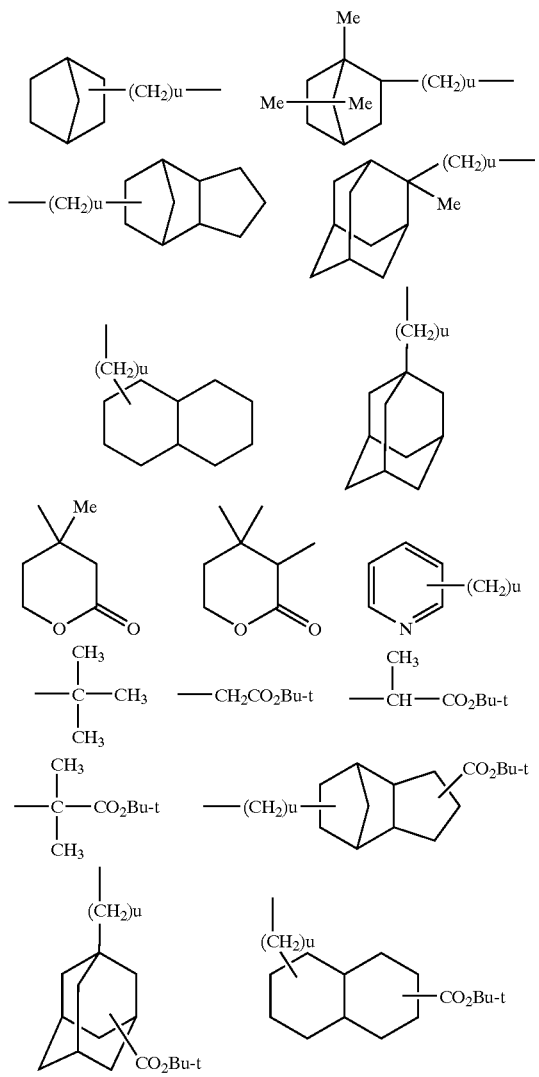

Further, as $R_9$, the groups represented by the following formula wherein $R_{17}$ represents C1 through C20 alkyl unsubstituted or substituted with alkoxy, C5 through C10 cycloalkyl, or C6 through C20 aryl unsubstituted or substituted with alkoxy; $R_{18}$ represents a hydrogen atom or C1 through C3 alkyl; and $R_{19}$ represents a hydrogen atom, C1 through C6 alkyl, or C1 through C6 alkoxy groups, can be specifically exemplified. As such substituents, specifically 1-methoxyethyl, 1-ethoxyethyl, 1-methoxypropyl, 1-methyl-1-methoxyethyl, 1-(isopropoxy) ethyl can be exemplified.

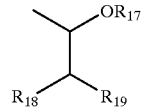

The repeated unit in the polymer chain (A) having the repeated unit (A21) represented by the general formula (IV) may be alone or a mixture of two or more, and in the case of a mixture of two or more, it is not especially limited and may be bound by random or by a block. Further, in such a case, the molar ratio is not especially limited, but in the case of a mixture of two, any of the ratios ranging from 1/9 to 9/1 can be employed.

The above polymer chain (A2) is preferably one having the repeated unit (A21) represented by the general formula (IV) and the repeated unit (A22) represented by the general formula (V). The molar ratio of (A21) through (A22) in this polymer chain (A2) is not especially limited but the ratio [(A21)/(A22)] is of from 5/95 to 100/0, preferably in the range of from 50/50 to 99/1. In the repeated unit represented by the above general formula (V), $R_{10}$ represents a hydrogen atom, a methyl group or an aryl group which may have substituents and specifically, phenyl, p-tolyl, 4-methoxyphenyl groups and the like can be exemplified. $R_{11}$ represents a hydrogen atom, C1 through C6 alkyl or $OR_{12}$ group wherein $R_{12}$ represents a hydrogen atom, C1 through C6 alkyl or acidolytic/leaving group. As the above C1 through C6 alkyl groups, methyl, ethyl, isopropyl, t-butyl groups and the like can be specifically exemplified. As $R_{12}$ in the above $OR_{12}$ groups, specifically the same substituents as those exemplified as $R_5$ can be exemplified. The letter, t represents any of the integers of 1 through 3 wherein $R_{11}$ may be identical or different when t is 2 or more. The substituted sites of $R_{13}$ are not especially limited but the para- or meta position of the alkenyl group is preferable in the case of the $OR_{12}$ group.

The configuration of the repeated unit (A21) represented by the general formula (IV) and the repeated unit (A22) represented by the general formula (V) in the above polymer chain (A2) is not especially limited and may be any of the copolymers such as random polymerization, block polymerization and the like. Among them, the arm moiety having a polymer wherein the repeated units (A21) and (A22) are block-copolymerized by (A22) through (A21) sequentially from the central core is preferable.

The present invention can include repeated units other than the repeated units represented by the general formulae (I) through (V) as necessary. The repeated units are not especially limited so long as the repeated units are obtained from the compounds having double bond(s) capable of copolymerizing with the monomers corresponding to the general formulae (I) through (V). The repeated units not having acidic substituents such as sulfonic groups, carboxyl groups, hydroxyphenol groups and the like are preferred. As the monomers corresponding to the repeated units, the compounds containing vinyl groups, the compounds containing (meth) acroyl groups and the like can be exemplified.

As compounds containing vinyl groups, aromatic vinyl compounds containing heteroatoms such as vinyl pyridine and the like, vinyl ketone compounds such as methyl vinyl ketone, ethyl vinyl ketone and the like, vinyl ether compounds such as methyl vinyl ether, ethyl vinyl ether and the like, alicyclic vinyl compounds containing hetero atoms such as vinyl pyrrolidone, vinyl lactam and the like can be specifically exemplified.

Also, as the above compounds containing (meth) acroyl groups, (meth) acrylic amide or (meth) acrylonitrile and the like can be exemplified.

These vinyl group-containing compounds and (meth) acroyl group-containing compounds can be used alone or as a mixture of two or more. The repeated units obtained from these vinyl group-containing compounds and (meth) acroyl group-containing compounds can be contained in the alkenylphenol copolymer of the present invention by copolymerizing with the repeated units represented by the general formulae (I) through (V) by random or by a block.

The number average molecular weight of the polymer (arm polymer) chains constituting the arm moiety (A) of the star block copolymer of the present invention is not especially limited, and specifically the range of from 1,000 to 100,000 can be exemplified. When the number average molecular weight of the polymer chains constituting the arm moiety (A) is from 1,000 to 100,000, the polymer chains having a single peaked ratio (Mw/Mn) of the weight average molecular weight (Mw) to the number average molecular weight (Mn) at the range of from 1.00 to 1.50 is preferable.

As the central core of the star block copolymer of the present invention, polyfunctional coupling agents can be preferably exemplified, and, for example, a trifunctional or more compounds. Even in the case of bifunctional compounds, if they can form trifunctional or more compounds with polymerization, their use is not hampered. Especially, the central core wherein the polyfunctional coupling agent has a polymerization crosslinked structure is preferable.

As the above polyfunctional coupling agents, specifically, the compounds represented by the general formula (VI) such as divinyl aromatic compounds, trivinyl aromatic compounds and the like, diepoxide, diketone, dialdehyde, and the compounds represented by the following formula (X):

wherein X represents a halogen atom, or a substituent selected from the group consisting of alkoxyl groups of carbon atoms of from 1 through 6 and acyloxyl groups of carbon atoms of from 2 to 6; $R^1$ and $R^2$ each represent hydrogen atoms or monovalent hydrocarbon groups of carbon atoms of from 1 to 6, and $R^1$ and $R^2$ may be identical or different; $R^3$ represents a multivalent aromatic hydrocarbon group capable of having n of substituents $(CR^1R^2X)$ or a multivalent aliphatic hydrocarbon group wherein n represents any of the integers 3 through 6, can be included. Also the above polyfunctional coupling agents can include at least one compound selected from the silane compounds and the like consisting of the following formulae.

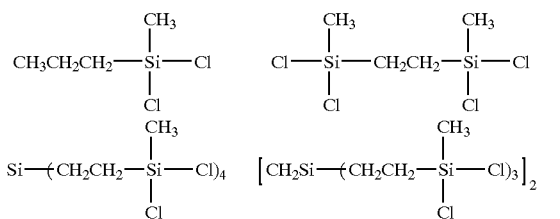

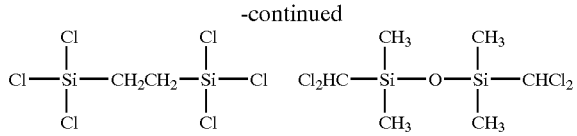

The above divinyl aromatic compounds can include but are not especially limited to, for example, 1,3-divinyl benzene, 1,4-divinyl benzene, 1,2-diisopropenyl benzene, 1,3-diidopropenyl benzene, 1,4-diisopropenyl benzene, 1,3-divinyl naphthalene, 1,8-divinyl naphthalene, 2,4-divinyl phenyl, 1,2-divinyl-3,4-dimethyl benzene, 1,3-divinyl-4,5,8-tributyl naphthalene, 2,2'-divinyl-4-ethyl-4'-propyl biphenyl. These may be used alone or in combination of two or more.

As such divinyl aromatic compounds, for example, those commercially available as mixtures with ethylvinyl benzene and the like can be used as such so long as the above divinyl aromatic compound is a major component. Also, their purity may be increased by purification as needed. Furthermore, a mixture with other double bond aromatic compounds capable of polymerizing such as styrene can be used. In this case, the mixture ratio of styrene is not specifically limited so long as it can form a crosslinked polymerization of the central core by mixing with the divinyl aromatic compound, and is in the range of from 1 to 50%, and preferably from 5 to 20% by weight.

The above trivinyl aromatic compounds can include but are not especially limited to, for example, 1,2,4-trivinyl benzene, 1,3,5-trivinyl naphthalene, 3,5,4'-trivinyl biphenyl, 1,5,6-trivinyl-3,7-diethyl naphthalene and the like. These may be used alone or in combination with two or more.

Also, as the above divinyl aromatic compounds and trivinyl aromatic compounds, the chemical group represented by the general formula (VI) wherein the spacer is inserted between the vinyl group and the aromatic ring can be preferably exemplified. More specifically, the compounds represented below can be exemplified. These may be used alone or in combination with two or more.

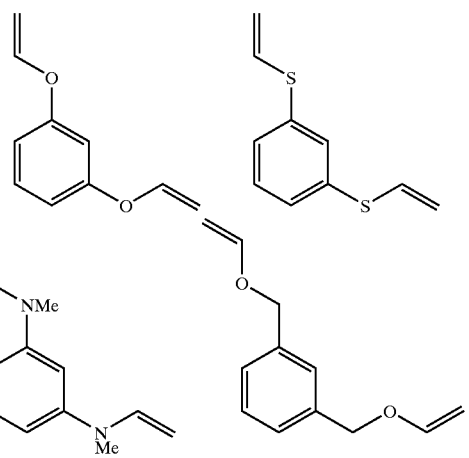

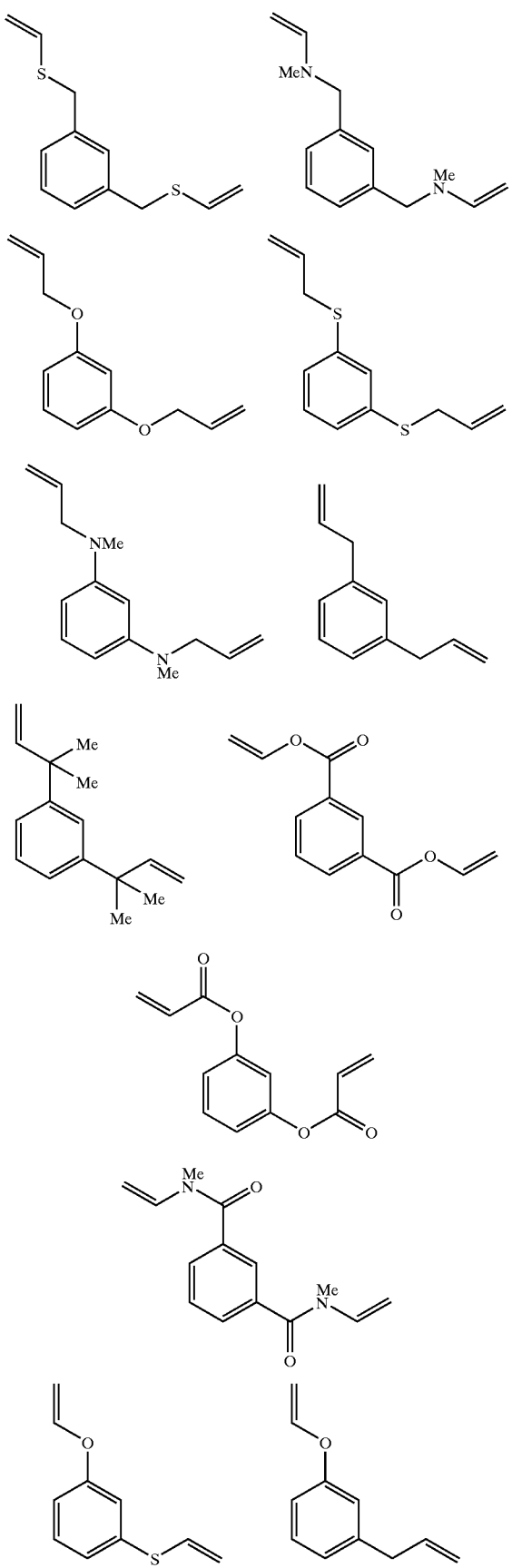

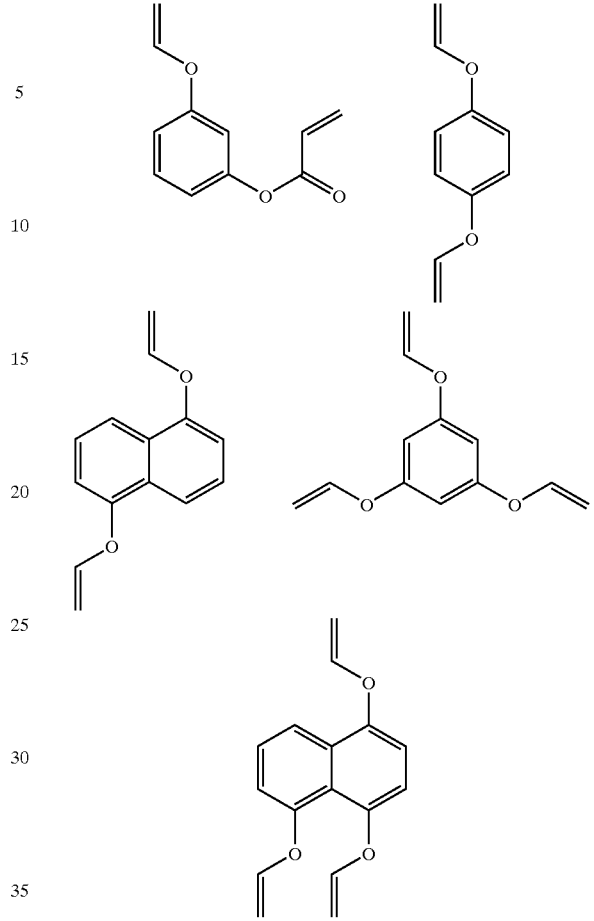

Examples of the above diepoxide can include but are not especially limited to, for example, cyclohexane diepoxide, 1,4-pentane diepoxide, 1,5-hexane diepoxide and the like. These may be used alone or in combination with two or more.

Examples of the above diketone can include but are not especially limited to, for example, 2,4-hexane dione, 2,5-hexane dione, 2,6-heptane dione and the like. These may be used alone or in combination with two or more.

Examples of the above dialdehyde can include but are not especially limited to, for example, 1,4-butanedial, 1,5-pentanedial, 1,6-hexanedial and the like. These may be used alone or in combination with two or more.

In the above general formula (X), X represents a halogen atom, an alkoxyl group of carbon atoms of from 1 through 6, or acyloxy group of carbon atoms of from 2 through 6. The above halogen atoms can include chlorine, fluorine, bromine, iodine and the like. The above alkoxyl groups of carbon atoms of from 1 through 6 can include but are not especially limited to, for example, methoxy, ethoxy, n- or iso-propoxy and the like. The above acyloxy groups of carbon atoms of from 2 through 6 can include but are not especially limited to, for example, an acetyloxy group, a propionyloxy group, and the like.

In the above general formula (X), $R^1$ and $R^2$ each represent hydrogen atoms or monovalent hydrocarbon groups of carbon atoms of from 1 through 6. $R^1$ and $R^2$ may be identical or different. Also, multiple $R^1$ and multiple $R^2$ each may be identical or different. The above monovalent hydrocarbon groups of carbon atoms of from 1 through 6 can include but are not especially limited to, for example, methyl, ethyl, n- or iso-propyl groups and the like.

In the above general formula (X), $R^3$ represents a multivalent aromatic hydrocarbon group capable of having n of substituents ($CR^1R^2X$) or a multivalent aliphatic hydrocarbon group as mentioned above. The letter n represents any of the integers of from 3 through 6. And as the compounds represented by such general formula (X), the compounds represented by the following chemical formulae can be specifically exemplified.

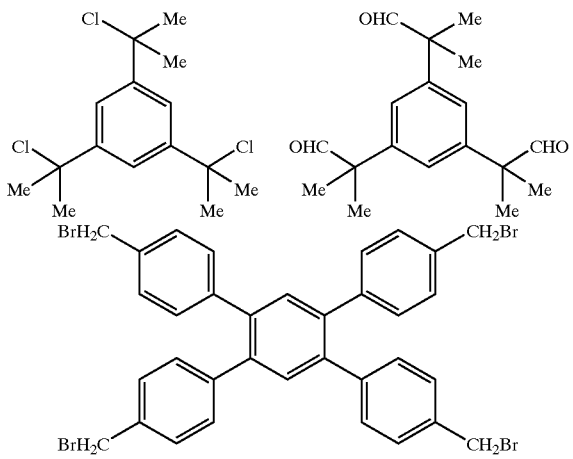

In addition to the above compounds exemplified, the compounds represented by the following chemical formulae can be exemplified as polyfunctional coupling agents.

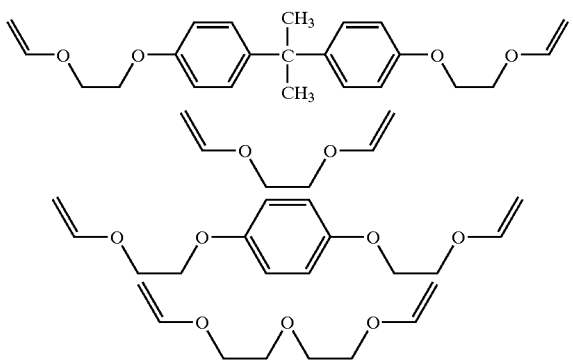

The process for producing the star block copolymer of the present invention is not especially limited so long as it is a process by homopolymerizing by anionic polymerization using an anionic polymerization initiator as a polymerization initiator the compound represented by the general formula (VII) wherein $R_3$, $R_4$, $R_5$, and q are the same as mentioned above, subsequently copolymerizing a polyfunctional coupling agent, and eliminating protection of phenol hydroxyl groups; or by homopolymerizing by anionic polymerization using an anionic polymerization initiator as a polymerization initiator a compound represented by the general formula (VII) or by copolymerizing with a compound capable of copolymerizing with the compound represented by the general formula (VII), subsequently copolymerizing a polyfunctional coupling agent and further copolymerizing a compound capable of anion polymerizing, and then eliminating protection of phenol hydroxyl groups.

In the compound represented by the above formula (VII), $R_3$, $R_4$, $R_5$, and q are the same as mentioned above, and the same substituents can be exemplified. As compounds represented by the general formula (VII), specifically p-t-butoxystyrene, p-t-butoxy-α-methylstyrene, p-(tetrahydropyranyloxy)styrene, p-(tetrahydropyranyloxy)-α-methylstyrene, p-(1-ethoxyethoxy) styrene, p-(1-ethoxyethoxy)-α-methylstyrene and the like can be exemplified. These can be used alone or in a mixture of two or more.

As the anionic polymerization initiators used in the above anionic polymerization, alkali metals or organic alkali metals can be exemplified. As alkali metals, lithium, sodium, potassium, cesium and the like can be exemplified. As organic alkali metals, alkylated, allylated and arylated compounds of the above alkali metals can be exemplified. Specifically, ethyl lithium, n-butyl lithium, sec-butyl lithium, tert-butyl lithium, sodium ethyl, lithium biphenyl, lithium naphthalene, lithium triphenyl, sodium naphthalene, α-methyl styrene sodium dianion, 1,1-diphenylhexyl lithium, 1,1-diphenyl-3-methylpenthyl lithium and the like can be included.

The process for producing the star block copolymer of the present invention can include:

(1) a process by anion polymerizing the compound represented by the general formula (VII) alone or anion polymerizing the compound represented by the general formula (VII) and the compound represented by the general formula (VIII) or anion polymerizing the compound represented by the general formula (VII) and the compound having double bonds capable of copolymerizing with the compound in the presence of an anionic polymerization initiator to synthesize the arm polymer, subsequently reacting the polyfunctional coupling agent, and then eliminating the entirety or parts of the protective groups of phenol hydroxyl groups from the resultant copolymer;

(2) a process by reacting the polyfunctional coupling agent to form the polyfunctional core, subsequently anion polymerizing the compound represented by said general formula (VII) alone or the compound represented by the general formula (VII) and the compound represented by the general formula (VIII) or the compound represented by the general formula (VII) and the compound having double bonds capable of copolymerizing with the compound in the presence of an anionic polymerization initiator to synthesize the arm polymer, and then eliminating the entirety or parts of the protective groups of phenol hydroxyl groups from the resultant copolymer; and (3) a process by anion polymerizing the compound represented by the general formula (VII) alone or the compound represented by the general formula (VII) and the compound represented by the general formula (VIII) or the compound represented by the general formula (VII) and the compound having double bonds capable of copolymerizing with the compound to synthesize an arm polymer, subsequently reacting a polyfunctional coupling agent, further reacting the monomer capable of anion polymerizing such as the compounds represented by the general formulae (IX), (VIII) and (IX) in the presence of an anionic polymerization initiator, and then eliminating the entirety or parts of the protective groups of phenol hydroxyl groups from the resultant copolymer. The above (1) and (3) are easy for controlling the reaction and preferable in terms of producing the star block copolymer of which the structure is controlled.

Additionally, the star block copolymer of the present invention can be produced by cation polymerizing the compound represented by the general formula (VII) alone or the compound represented by the general formula (VII) and the compound represented by the general formula (VIII) or the compound represented by the general formula (VII) and the compound having double bonds capable of copolymerizing with the compound, subsequently reacting the polyfunctional coupling agent, and then eliminating entire or parts of protective groups of phenol hydroxyl groups from the resultant copolymer in the presence of a cationic polymerization initiator such as triethylamine, 2-chloro-2,4,4-trimethyl-1-pentene/$TiCl_4$ and the like.

The polymerization reaction to synthesize the arm polymer in the above process (1) or (3) can be conducted by either the method of dropping the anionic polymerization initiator into the monomer (mixed) solution or the method of dropping the monomer (mixed) solution into the solution containing the anionic polymerization initiator. The method of dropping the monomer (mixed) solution into the solution containing the anionic polymerization initiator is preferable in terms of ability to control molecular weight and molecular weight distribution. The synthetic reaction of the arm polymer is usually carried out in the organic solvents under an inert gas atmosphere such as nitrogen, argon, and the like at a temperature ranging from −100 to 50° C., and preferably from −100 to 40° C.

The organic solvents used in the synthetic reaction of the above arm polymer can include organic solvents usually used in anionic polymerization such as anisole, hexamethylphosphoramide, and the like in addition to aliphatic hydrocarbons such as n-hexane, n-heptane, and the like, alicyclic hydrocarbons such as cyclohexane, cyclopentane and the like, aromatic hydrocarbons such as benzene, toluene, and the like, and ethers such as diethyl ether, tetrahydrofuran (THF), dioxane, and the like. These can be used as a single solvent or a mixed solvent of two or more. Among them, the mixed solvents of tetrahydrofuran with toluene, tetrahydrofuran with hexane, and tetrahydrofuran with methylcyclohexane can be preferably exemplified in terms of polarity and solubility.

The polymerization forms of the arm polymer can include a random copolymer in which each component is statistically distributed throughout the entirety of the copolymer chain, partial block copolymer, and complete block copolymer. Each of these can be synthesized by selecting the compound represented by the general formula (VII) described above and the additional method of vinyl aromatic compound and the like. For example, the random copolymer can be synthesized by polymerization by adding the mixture of the compound represented by the general formula (VII) and the vinyl aromatic compound into a reaction system. The partial block copolymer can be synthesized by previously polymerizing the entirety of either one and subsequently continuing polymerization by adding the other mixture or by previously polymerizing partially either one and subsequently continuing polymerization by adding the mixture of both. The complete block copolymer can be synthesized by polymerization by sequentially adding the compound represented by the general formula (VII) and the vinyl aromatic compound into the reaction system.

The reaction of the star block copolymer of which a branched polymer chain is the resultant arm polymer can be carried out by adding the aforementioned polyfunctional coupling agent to the reaction solution after completion of the synthetic reaction of the arm polymer. The polymer of which the structure is controlled and the distribution of molecular weight is narrow can be obtained by usually conducting the reaction in the organic solvent under an inert gas atmosphere such as nitrogen, argon, and the like at a temperature ranging from −100° C. to 50° C., and preferably from −70° C. to 40° C. Such generation reaction of the star block copolymer can be carried out subsequently in the solvent used to form the arm polymer, can be carried out in the solvent of which composition is changed by adding other solvents, or carried out by replacing the solvent to the other solvent. As such solvents, the same solvents can be used as those used in the synthetic reaction of the arm polymer.

In the process producing the star block copolymer of the present invention, the molar ratio [(C)/(D)] is preferably from 0.1 to 10 for the polyfunctional coupling agent (C) to an active end of the polymer chain homopolymerizing the compound represented by the general formula (VII) or an active end (D) of the polymer chain copolymerizing the compound represented by the formula (VII) and the compound capable of copolymerizing by anionic polymerization using the anionic polymerization initiator as the polymerization initiator. When polyvinyl compounds such as divinyl benzene and the like are used as the polyfunctional coupling agent, the quantity of the polyvinyl compounds to be added is preferably in the range from 0.1 to 10 equivalents, and preferably from 1 to 10 equivalents based on the amount of the active end of the arm polymer chain. The reaction of the arm polymer chain with the polyfunctional coupling agent can employ either the method in which the polyfunctional coupling agent is added to the arm polymer chain having the active end or the method in which the arm polymer chain having the active end is added to the polyfunctional coupling agent.

The number of arms of the star block copolymer is determined depending on an additional quantity of the polyvinyl compound, reaction temperature, and reaction period, and usually multiple star block copolymers with different numbers of the arm are simultaneously generated by influences of different reactivity of living polymer ends and vinyl groups and steric hindrance. As the star block copolymer of the present invention, those having three or more of the arm are preferred. The ratio (Mw/Mn) of the weight average molecular weight (Mw) to the number average molecular weight (Mn) of the generated star block copolymer is preferably in the range of from 1.00 to 1.50, and the number average molecular weight of the star block copolymer is preferably from 3,000 to 300,000.

In the process (3) wherein new arm polymer chains are formed by reacting the monomers capable of anion polymerizing to the central core (polyfunctional core) having the active end formed by reacting the arm polymer chain previously adjusted with the polyfunctional coupling agent, the star block copolymer having different types of arm polymer chains can be produced. The monomer capable of directly polymerizing can be reacted to the active end present in the central core. Also the monomer can be reacted after reaction of the compounds such as diphenyl ethylene, stilbene, and the like or after the addition of alkali metals such as lithium chloride or metallic salts of alkali earth metals. The latter is sometimes advantageous in controlling the entire structure of the generated star block copolymer because the polymerization reaction is processed slowly when a highly reactive monomer such as acrylate derivatives is reacted. Also the above reaction can be carried out subsequently in the solvent used to form the central core having the active end, can be carried out in the solvent of which composition is changed by adding other solvents, or carried out by replacing the solvent to the other solvent. As such solvent, the same solvents can be exemplified as those used for synthesis of the arm polymer. Also, it is possible that random copolymerized polymer chains are made by mixing and reacting two types of monomers as the arm polymer chain newly introduced for the active end of the central core in the process (3) or as the arm polymer chain in the process (2) and that block polymer chains are made by sequentially adding two types of monomers. It is also possible that functional groups are introduced to the ends by adding carbon dioxide, epoxy and the like after completion of the reaction.

The reaction eliminating protective groups of phenol hydroxyl groups from such a resultant copolymer and generating alkenylphenol skeletons is carried out in the presence of the mixed solvent of one or more of alcohols such as methanol, ethanol and the like, ketones such as acetone, methylethyl ketone and the like, multivalent alcohol derivatives such as methyl cellosolve, ethyl cellosolve and the like, water and the like, using an acid reagent such as hydrochloric acid, sulfuric acid, hydrochloric gas, hydrobromic gas, p-toluene sulfonate, 1,1,1-trifluoro acetate, bisulfate represented by the following formula: $XHSO_4$ wherein X represents an alkali metal such as Li, Na, K and the like as a catalyst at a temperature ranging from room temperature to 150° C. in addition to the solvents exemplified by the polymerization reaction.

In this reaction, the protective groups of phenol hydroxyl groups are selectively eliminated entirely or partially by appropriately combining the type and concentration of the solvent, the type and additional quantity of the catalyst, and the reaction temperature and period, thereby being capable of producing the alkenylphenol star block copolymer with narrow dispersion in the present invention of which the structure is controlled.

Among the star block copolymers obtained as described above having alkenylphenol skeletons of the present invention, the arm polymer is sometimes contaminated in the final product due to incomplete reaction in the copolymer obtained from the reaction of the polyfunctional coupling agent with the arm polymer. In this case, it is possible that the arm polymer chain is eliminated as needed if physical properties of the star block copolymer are variable. The fractional reprecipitation can be suitably exemplified as an eliminating method. In such fractional reprecipitation, reprecipitation is performed preferably using a mixed solvent of high and lower polymer-soluble solvents. In the mixed solvent of high and lower polymer-soluble solvents, the method in which the star block copolymer is heat-dissolved and cooled, the method in which the star block copolymer is crystallized by dissolving in the high polymer-soluble solvent followed by adding the lower polymer-soluble solvent, and the like can be exemplified. The latter method can be also performed by appropriately heating the solvent. Lower alcohols such as methanol, ethanol, and the like as the above highly soluble solvents and water as the above lower soluble solvent are preferably exemplified in the star block copolymer. The mixed ratio of both solvents is varied depending on the star block copolymer to be purified. Its volume ratio [(highly polymer-soluble solvent)/(lower polymer-soluble solvent)] is preferably in the range of from 90/10 to 10/90 and more preferably from 80/20 to 20/80. The concentration of such solution is not especially limited, but for example, the range of from 1 to 50%, and more preferably the range of from 2 to 30% can be exemplified. When it is 1% or less, the crystallized yield is decreased due to such amounts of solvent. When it is 50% or more, efficiency to eliminate impurities is decreased. The objective star block copolymer can be taken in an almost pure form by repeating these manipulations several times.

Best Mode for Carrying Out the Invention

The present invention is described by examples in more detail below. But the technical scope of the present invention is not limited by the following examples.

EXAMPLE 1

Under a nitrogen atmosphere, n-butyl lithium (50 mmol, abbreviated as NBL hereinafter) was added to a mixed solvent of toluene (750 g) and tetrahydrofuran (750 g, abbreviated as THF hereinafter), subsequently p-tert butoxy-styrene (1 mol, abbreviated as PTBST hereinafter) was dropped over one hour by stirring and maintaining a temperature at −40° C., and further the reaction was continued for one hour followed by confirming the completion of the reaction by gas chromatography (abbreviated as GC hereinafter). At this step, an aliquot was taken from the reaction system and analyzed by gel permeation chromatography (abbreviated as GPC hereinafter) after stopping the reaction with methanol. The resultant PTBST polymer was a monodisperse polymer with Mn of 3700 and Mw/Mn of 1.10.

Then while maintaining the temperature of the reaction system at −40° C., divinyl benzene (150 mmol, abbreviated as DVB hereinafter) was added and the reaction was continued for an additional 4 hours followed by confirming no residual monomer by GC. Then, the reaction was terminated by adding methanol to the reaction system, and the reaction solution was poured into excess amounts of methanol to precipitate a polymer. After filtrating and washing, drying with reduced pressure at 60° C. for 15 hours afforded a white powder polymer. The polymerization yield based on the total monomers used was 99.5%. The GPC analysis of this polymer showed that it was a monodisperse polymer with Mn of 29000 and Mw/Mn of 1.14.

Then the resultant polymer (10 g) was dissolved in a mixed solvent of toluene/ethanol=1/1 (weight ratio) to make 25% solution, subsequently sulfuric acid (1.4 g) was added and the reaction was carried out at 40° C. for 45 hours followed by pouring the reaction solution into excess amounts of water to precipitate a polymer. After filtrating and washing, drying with reduced pressure at 60° C. for 5 hours afforded 7.1 g of a white powder polymer.

The infrared absorption spectra (abbreviated as IR hereinafter) and $^{13}CNMR$ of the polymers before and after the reaction were compared in this reaction. In IR observation, the absorption at 890 cm$^{-1}$ derived from t-butyl groups of poly-PTBST disappeared after the reaction, and broad absorption around 3300 cm$^{-1}$ derived from hydroxyl groups was newly observed. The peaks around 77 ppm and 153 ppm derived from t-butyl groups of poly-PTBST disappeared after the reaction. The GPC analysis of the generated polymer showed that it was a monodisperse polymer with Mn of 26500 and Mw/Mn of 1.16.

Consequently, it was confirmed that the copolymerization reaction and following elimination reaction were carried out as being set and that the alkenylphenol star block copolymer in which p-hydroxystyrene segment is a main skeleton was generated.

EXAMPLE 2

Under a nitrogen atmosphere, 30 mmol of NBL was added to 2000 g of THF, 1 mol of PTBST was dropped over one hour by stirring and maintaining the temperature at −60° C., and the reaction was further continued for one hour followed by confirming the completion of the reaction by GC. At this step, an aliquot was taken from the reaction system and analyzed by GPC after stopping the reaction with methanol. The resultant PTBST polymer was a monodisperse polymer with Mn of 5700 and Mw/Mn of 1.10. Then, while maintaining the temperature of the reaction system at −60° C., 30 mmol of DVB was added, and the reaction was continued for an additional 4 hours followed by confirming no residual monomer by GC.

Then, the reaction was terminated by adding methanol to the reaction system, and the reaction solution was poured into excess amounts of methanol to precipitate a polymer. After filtrating and washing, drying with reduced pressure at 60° C. for 15 hours afforded a white powder polymer. The polymerization yield based on the total monomers used was 99.1%. The GPC analysis of this polymer showed that it is a mixture of a polymer with Mn of 35000 and Mw/Mn of 1.15 and a polymer with Mn of 5700.

Then, 10 g of the resultant polymer was dissolved in a mixed solvent of THF/ethanol=4/1 (weight ratio) to make 25% solution, 3 g of concentrated hydrochloric acid was added, and the reaction was carried out at 50° C. for 30 hours. Then, the reaction solution was poured into excess amounts of water to precipitate a polymer. After filtrating and washing, drying with reduced pressure at 60° C. for 5 hours afforded 6.9 g of a white powder polymer.

In this reaction, IR and NMR of the polymers before and after reaction were determined. The peak derived from t-butoxy groups of the PTBST segments was confirmed to disappear as in the case of Example 1. The GPC analysis of the generated polymer showed that it was a mixture of a polymer with Mn of 32000 and Mw/Mn of 1.19 and a polymer with Mn of 5100.

Consequently, it was confirmed that the copolymerization reaction and following elimination reaction were carried out as being set and that the alkenylphenol star block copolymer in which p-hydroxystyrene segment is a main skeleton was generated.

EXAMPLE 3

Under a nitrogen atmosphere, 20 mmol of NBL was added to a mixed solvent of 1200 g of THF and 300 g of hexane, 1 mol of PTBST was dropped over one hour by stirring and maintaining a temperature at −60° C., and the reaction was further continued for one hour followed by confirming the completion of the reaction by GC. At this step, an aliquot was taken from the reaction system and analyzed by GPC after stopping the reaction with methanol. The resultant PTBST polymer was a monodisperse polymer with Mn of 8900 and Mw/Mn of 1.07.

Then, after raising the temperature of the reaction system up −40° C., a mixture of 96 mmol of DVB and 4 mmol of ethylvinyl benzene was added and the reaction was continued for an additional 4 hours followed by confirming no residual monomer by GC. Then, the reaction was terminated by adding methanol to the reaction system, and the reaction solution was poured into excess amounts of methanol to precipitate a polymer. After filtrating and washing, drying with reduced pressure at 60° C. for 15 hours afforded a white powder polymer. The polymerization yield based on the total monomers used was 99.5%. The GPC analysis of this polymer showed that it was a mixture of a polymer with Mn of 70000 and Mw/Mn of 1.21 and a polymer with Mn of 8900.

Then, 10 g of the resultant polymer was dissolved in a mixed solvent of toluene/ethanol=1/2 (weight ratio) to make 25% solution, 3 g of sulfuric acid was added, and the reaction was carried out at 40° C. for 45 hours. Then, the reaction solution was poured into excess amounts of water to precipitate a polymer. After filtrating and washing, drying with reduced pressure at 60° C. for 5 hours afforded 7.0 g of a white powder polymer.

In this reaction, IR and NMR of the polymers before and after reaction were determined. The peak derived from t-butoxy groups of the PTBST segments was confirmed to disappear as in the case of Example 1. The GPC analysis of the generated polymer showed that it was a mixture of a polymer with Mn of 64000 and Mw/Mn of 1.22 and a polymer with Mn of 8000 (10%). Consequently, it was confirmed that the copolymerization reaction and following elimination reaction were carried out as being set and that the alkenylphenol star polymer in which p-hydroxystyrene segment is a main skeleton was generated.

The mixture (3.5 g) obtained as described above was added to a mixed solvent of purified water/methanol (volume ratio: 1/1) so that its concentration is 2% by weight, heated and dissolved, subsequently left to room temperature and crystallized and then filtrated to yield 3.0 g of crystal. The analysis of the crystal using GPC showed that the residual arm polymer was 0.35%.

Also, 3.5 g of the mixture obtained as described above was dissolved in 35 ml of methanol and then 35 ml of purified water was added to crystallize followed by filtrating to yield 3.2 g of crystal. The analysis of the crystal using GPC showed that the residual arm polymer was 4.26%.

Consequently, it was confirmed that the copolymerization reaction and following elimination reaction were carried out as being set and that the alkenylphenol star polymer in which p-hydroxystyrene segment is a main skeleton was generated.

EXAMPLE 4

Under a nitrogen atmosphere, 29 mmol of NBL was added to 2000 g of THF, subsequently a mixture of 1 mol of PTBST and 0.3 mole of styrene was dropped over one hours by stirring and maintaining the temperature at −50° C., and the reaction was continued for an additional one hour followed by confirming the completion of the reaction by GC. At this step, PTBST/styrene polymer was a monodisperse polymer with Mn of 7200 and Mw/Mn of 1.05. Then, after raising the temperature of the reaction system up −30° C., 30 mmol of DVB was added and the reaction was continued for an additional 5 hours followed by confirming the completion of the reaction by GC.

Then, the reaction was terminated by adding methanol to the reaction system, and the reaction solution was poured into excess amounts of methanol to precipitate a polymer. After filtrating and washing, drying with reduced pressure at 60° C. for 15 hours afforded a white powder polymer. The polymerization yield based on the total monomers used was 99.3%. The GPC analysis of this polymer showed that it is a mixture of a monodisperse polymer with Mn of 63000 and Mw/Mn of 1.20 and a polymer with Mn of 7200.

Then, 10 g of the resultant polymer was dissolved in a mixed solvent of THF/ethanol=1/1 (weight ratio) to make 25% solution, 3 g of sodium hydrogen sulfate was added and the reaction was carried out at 50° C. for 20 hours. Subsequently, the reaction solution was filtrated to eliminate sodium hydrogen sulfate. The filtrate was poured into excess amounts of water to precipitate a polymer. After filtrating and washing, drying with reduced pressure at 60° C. for 5 hours afforded 7.1 g of a white powder polymer. In this reaction, IR and NMR of the polymers before and after reaction were determined. The peak derived from t-butoxy groups of the PTBST segments was confirmed to disappear as in the case of Example 1. The GPC analysis of the generated polymer showed that it was a mixture of a polymer with Mn of 56000 and Mw/Mn of 1.24 and a polymer with Mn of 6500.

Consequently, it was confirmed that the copolymerization reaction and elimination reaction were carried out as being set and that the alkenylphenol star polymer in which a random copolymer of p-hydroxystyrene and styrene is a main skeleton was generated.

EXAMPLE 5

Under a nitrogen atmosphere, 40 mmol of NBL was added to a mixed solvent of 1000 g of toluene and 1000 g of THF, subsequently 1M of PTBST was dropped over one hour by stirring and maintaining a temperature at −40° C., and the reaction was continued for an additional one hour followed by confirming the completion of the reaction by GC. At this step, the PTBST polymer was a monodisperse polymer with Mn of 4500 and Mw/Mn of 1.11. Then, 0.3 mol of styrene was dropped over 15 min, and the reaction was continued for an additional one hour followed by confirming the completion of the reaction by GC. At this step, the PTBST/styrene block copolymer was a monodisperse polymer with Mn of 5300 and Mw/Mn of 1.09. Finally, while maintaining the temperature of the reaction system at −40° C., 120 mmol of DVB was added and the reaction was continued for an additional 5 hours followed by confirming the completion of the reaction by GC.

Then, the reaction was terminated by adding methanol to the reaction system, and the reaction solution was poured into excess amounts of methanol to precipitate a polymer. After filtrating and washing, drying with reduced pressure at 60° C. for 15 hours afforded a white powder polymer. The polymerization yield based on the total monomers used was 99.3%. The GPC analysis of this polymer showed that it was a monodisperse polymer with Mn of 34000 and Mw/Mn of 1.18.

Then, 10 g of the resultant polymer was dissolved in a mixed solvent of THF/ethanol=2/1 (weight ratio) to make 25% solution, 3 g of sodium hydrogen sulfate was added and the reaction was carried out at 50° C. for 20 hours. Subsequently, the reaction solution was filtrated to eliminate sodium hydrogen sulfate. The filtrate was poured into excess amounts of water to precipitate a polymer. After filtrating and washing, drying with reduced pressure at 60° C. for 5 hours afforded 7.2 g. of a white powder polymer. In this reaction, IR and NMR of the polymers before and after reaction were determined. The peak derived from t-butoxy groups of the PTBST segments was confirmed to disappear as in the case of Example 1. The GPC analysis of the generated polymer showed that it was a monodisperse polymer with Mn of 30000 and Mw/Mn of 1.22.

Consequently, it was confirmed that the copolymerization reaction and elimination reaction were carried out as being set and that the alkenylphenol star polymer in which a block copolymer of p-hydroxystyrene segments and styrene segments is a main skeleton was generated.

EXAMPLE 6

Under a nitrogen atmosphere, 30 mmol of NBL was added to 2000 g of THF, 1 mol of PTBST was dropped over one hour by stirring and maintaining a temperature at −60° C., and the reaction was further continued for one hour followed by confirming the completion of the reaction by GC. At this step, an aliquot was taken from the reaction system and analyzed by GPC after stopping the reaction with methanol. The resultant polymer was a monodisperse polymer with Mn of 6100 and Mw/Mn of 1.12.

Then, while maintaining the temperature of the reaction system at −60° C., 90 mmol of DVB was added, and the reaction was continued for an additional 3 hours followed by confirming no residual monomer by GC. At this step, an aliquot was taken from the reaction system and analyzed by GPC after stopping the reaction with methanol. The resultant polymer was a monodisperse polymer with Mn of 45100 and Mw/Mn of 1.16. Then, while maintaining a temperature of the reaction system at −60° C., 45 mmol of 1,1-diphenyl ethylene (abbreviated as DPE hereinafter) was added and aged for 30 min. Subsequently, 0.43 mol of tert-butyl methacrylate (abbreviated as t-BMA hereinafter) was added and the reaction was continued for an additional one hour. Finally, the reaction was terminated by adding methanol to the reaction system, and the reaction solution was poured into excess amounts of methanol to precipitate a polymer. After filtrating and washing, drying with reduced pressure at 60° C. for 15 hours afforded a white powder polymer. The polymerization yield based on the total monomers used was 99.1%. The GPC analysis of this polymer showed that it was a monodisperse polymer with Mn of 46400 and Mw/Mn of 1.20.

Then, 10 g of the resultant polymer was dissolved in a mixed solvent of THF/ethanol=4/1 (weight ratio) to make 25% solution, 2 g of concentrated hydrochloric acid was added, and the reaction was carried out at 50° C. for 30 hours. Then, the reaction solution was poured into excess amounts of water to precipitate a polymer. After filtrating and washing, drying with reduced pressure at 60° C. for 5 hours afforded 7.2 g of a white powder polymer.

In this reaction, infrared absorption spectrum (abbreviated as IR hereinafter) and NMR of polymers before and after the reaction were compared. In IR observation, absorption at 890 $cm^{-1}$ derived from t-butyl groups of poly-PTBST disappeared after the reaction, and broad absorption of approximately 3300 $cm^{-1}$ derived from hydroxyl groups was newly observed. The peak around 77 ppm derived from t-butyl groups of poly-PTBST disappeared after the reaction. The GPC analysis of the generated polymer showed that it was a polymer with Mn of 42000 and Mw/Mn of 1.21.

EXAMPLE 7

Under a nitrogen atmosphere, 23 mmol of NBL was added to a mixed solvent of 1600 g of toluene and 400 g of THF, and 1 mol of PTBST was dropped over one hour by stirring and maintaining a temperature at −40° C. The reaction was continued for an additional one hour and completion of the reaction was confirmed by GC. At this step, an aliquot was taken from the reaction system and analyzed by GPC after stopping the reaction with methanol. The resultant PTBST polymer was a monodisperse polymer with Mn of 7900 and Mw/Mn of 1.07.

Then, while maintaining the temperature of the reaction system at −40° C., 50 mmol of DVB was added, and the reaction was continued for an additional 3 hours followed by confirming no residual monomer by GC. At this step, an aliquot was taken from the reaction system and analyzed by GPC after stopping the reaction with methanol. The resultant polymer was a mixture of a monodisperse polymer with Mn of 61500 and Mn/Mw of 1.17 and a polymer with Mn of 7900. Next, while maintaining the temperature of the reaction system at −40° C., 28 mmol of DPE was added and aged for 30 min. Subsequently, 0.2 mol of t-BMA was added and the reaction was continued for an additional one hour. Finally, the reaction was terminated by adding methanol to the reaction system, and the reaction solution was poured into excess amounts of methanol to precipitate a polymer. After filtrating and washing, drying with reduced pressure at 60° C. for 15 hours afforded a white powder polymer. The polymerization yield based on the total monomers used was 99.8%. The GPC analysis of this polymer showed that it was a mixture of a monodisperse polymer with Mn of 63000 and Mw/Mn of 1.21 and a polymer with Mn of 7900. Next, 10 g of the resultant polymer was dissolved in a mixed solvent of THF/ethanol=3/1 (weight ratio) to make 25% solution, 2.4 g of concentrated hydrochloric acid was added, and the reaction was carried out at 50° C. for 30 hours. Then, the reaction solution was poured into excess amounts of water to precipitate a polymer. After filtrating and washing, drying with reduced pressure at 60° C. for 5 hours afforded 6.9 g of a white powder polymer.

IR and NMR of polymers before and after the reaction altered as in the case of Example 1. The GPC analysis of the generated polymer showed that it was a mixture of a monodisperse polymer with Mn of 56000 and Mw/Mn of 1.21 and a polymer with Mn of 7100.

EXAMPLE 8

Under a nitrogen atmosphere, 18 mmol of NBL was added to a mixed solvent of 1000 g of toluene and 1000 g of THF, and 0.9 mol of PTBST was dropped over one hour by stirring and maintaining a temperature at −40° C. The reaction was continued for an additional one hour and completion of the reaction was confirmed by GC. At this step, an aliquot was taken from the reaction system and analyzed by GPC after stopping the reaction with methanol. The resultant PTBST polymer was a monodisperse polymer with Mn of 9100 and Mw/Mn of 1.09.

Then, while raising the temperature of the reaction system to −20° C., a mixture of 54 mmol of DVB and 13 mmol of styrene was added, and the reaction was continued for an additional 3 hours followed by confirming no residual monomer by GC. At this step, an aliquot was taken from the reaction system and analyzed by GPC after stopping the reaction with methanol. The resultant polymer was a mixture of a monodisperse polymer with Mn of 57000 and Mn/Mw of 1.17 and a polymer with Mn of 9100. Next, while maintaining a temperature of the reaction system at −20° C., 21 mmol of DPE was added and aged for 30 min. Subsequently, 0.1 mol of t-BMA was added and the reaction was continued for an additional one hour. Finally, the reaction was terminated by adding methanol to the reaction system, and the reaction solution was poured into excess amounts of methanol to precipitate a polymer. After filtrating and washing, drying with reduced pressure at 60° C. for 15 hours afforded a white powder polymer. The polymerization yield based on the total monomers used was 99.6%. The GPC analysis of this polymer showed that it was a mixture of a monodisperse polymer with Mn of 58200 and Mw/Mn of 1.21 and a polymer with Mn of 9100.

Then, 10 g of the resultant polymer was dissolved in a mixed solvent of THF/ethanol=1/1 (weight ratio) to make 25% solution, 0.5 g of concentrated sulfuric acid was added, and the reaction was carried out at 50° C. for 30 hours. Then, the reaction solution was poured into excess amounts of water to precipitate a polymer. After filtrating and washing, drying with reduced pressure at 60° C. for 5 hours afforded 6.9 g of a white powder polymer.

IR and NMR of polymers before and after the reaction altered as in the case of Example 1. The GPC analysis of the generated polymer showed that it was the mixture of a monodisperse polymer with Mn of 51200 and Mw/Mn of 1.20 and a polymer with Mn of 8100.

EXAMPLE 9

Under a nitrogen atmosphere, 50 mmol of NBL was added to a mixed solvent of 750 g of toluene and 750 g of THF, and 1 mol of PTBST was dropped over one hour by stirring and maintaining a temperature at −40° C. The reaction was continued for an additional one hour and completion of the reaction was confirmed by GC. At this step, an aliquot was taken from the reaction system and analyzed by GPC after stopping the reaction with methanol. The resultant PTBST polymer was a monodisperse polymer with Mn of 3700 and Mw/Mn of 1.10.

Then, while maintaining a temperature of the reaction system at −40° C., 150 mmol of DVB was added, and the reaction was continued for additional 4 hours followed by confirming no residual monomer by GC. Then, the reaction was terminated by adding methanol to the reaction system, and the reaction solution was poured into excess amounts of methanol to precipitate a polymer. After filtrating and washing, drying with reduced pressure at 60° C. for 15 hours afforded a white powder polymer. The polymerization yield based on the total monomers used was 99.5%. The GPC analysis of this polymer showed that it was a monodisperse polymer with Mn of 29000 and Mw/Mn of 1.14.

Then, 10 g of the resultant polymer was dissolved in a mixed solvent of toluene/ethanol=1/1 (weight ratio) to make 25% solution, and 1.4 g of sulfuric acid was added to start debutylation. The reaction was carried out at from. 65 to 70° C. An aliquot of the reaction solution was taken and its IR spectrum was determined to follow the reaction. After confirming that the elimination quantity reached a given quantity, the reaction system was rapidly cooled in an ice bath, and the reaction solution was poured into excess amounts of water to precipitate a polymer. After filtrating and washing, drying with reduced pressure at 70° C. for 5 hours afforded 7.0 g of a white powder polymer.

The GPC analysis of this polymer showed that it was a monodisperse polymer with Mn of 27000 and Mw/Mn of 1.15. The ratio of para-hydroxystyrene (PHS) unit/PTBST unit obtained by NMR was 0.88/0.12 (molar ratio).

EXAMPLE 10

Under a nitrogen atmosphere, 23 mmol of NBL was added to a mixed solvent of 1600 g of toluene and 400 g of THF, and 1 mol of PTBST was dropped over one hour by stirring and maintaining a temperature at −40° C. The reaction was continued for an additional one hour and completion of the reaction was confirmed by GC. At this step, an aliquot was taken from the reaction system and analyzed by GPC after stopping the reaction with methanol. The resultant PTBST polymer was a monodisperse polymer with Mn of 7900 and Mw/Mn of 1.07.

Then, while maintaining the temperature of the reaction system at −40° C., 50 mmol of DVB was added, and the reaction was continued for an additional 3 hours followed by confirming no residual monomer by GC. At this step, an aliquot was taken from the reaction system and analyzed by GPC after stopping the reaction with methanol. The resultant polymer was the mixture of a monodisperse polymer with Mn of 55300 and Mn/Mw of 1.17 and a polymer with Mn of 7900. Next, while maintaining a temperature of the reaction system at −40° C., 28 mmol of DPE was added and aged for 30 min. Further 0.2 mol of t-BMA was added and the reaction was continued for 2 hours. Finally, the reaction was terminated by adding methanol to the reaction system, and the reaction solution was poured into excess amounts of methanol to precipitate a polymer. After filtrating and washing, drying with reduced pressure at 60° C. for 15 hours afforded a white powder polymer. The polymerization yield based on the total monomers used was 99.8%. The GPC analysis of this polymer showed that it was a mixture of a monodisperse polymer with Mn of 56500 and Mw/Mn of 1.21 and a polymer with Mn of 7900.

Next, 10 g of the resultant polymer was dissolved in a mixed solvent of THF/ethanol=3/1 (weight ratio) to make 25% solution, and 2.4 g of concentrated hydrochloric acid was added to start debutylation at 50° C. The reaction was carried out at from 65 to 70° C. An aliquot of the reaction solution was taken and its IR spectrum was determined to follow the reaction. After confirming that the elimination quantity reached a given quantity, the reaction system was rapidly cooled in an ice bath, and the reaction solution was poured into excess amounts of water to precipitate a polymer. After filtrating and washing, drying with reduced pressure at 70° C. for 5 hours afforded 7.0 g of a white powder polymer.

The GPC analysis of this polymer showed that it was a monodisperse polymer with Mn of 49000 and Mw/Mn of 1.20. The ratio of PHS unit/PTBST unit obtained by NMR was 0.90/0.10 (molar ratio).

EXAMPLE 11

Under a nitrogen atmosphere, 29 mmol of NBL was added to 2000 g of THF, and the mixture of 1 mol of PTBST and 0.3 mol of styrene were dropped over one hour by stirring and maintaining a temperature at −50° C. The reaction was continued for an additional one hour and completion of the reaction was confirmed by GC. At this step, the PTBST/styrene polymer was a monodisperse polymer with Mn of 7200 and Mw/Mn of 1.05. Then, after raising the temperature of the reaction system to −30° C., 30 mmol of DVB was added and the reaction was continued for an additional 5 hours followed by confirming completion of the reaction by GC.

Then, the reaction was terminated by adding methanol to the reaction system, and the reaction solution was poured into excess amounts of methanol to precipitate a polymer. After filtrating and washing, drying with reduced pressure at 60° C. for 15 hours afforded a white powder polymer. The polymerization yield based on the total monomers used was 99.3%. The GPC analysis of this polymer showed that it was the mixture of a monodisperse polymer with Mn of 47000 and Mw/Mn of 1.20 and a polymer with Mn of 7200.

Next, 10 g of the resultant polymer was dissolved in a mixed solvent of THF/ethanol=1/1 (weight ratio) to make 25% solution, and 1.4 g of sulfuric acid was added to start debutylation. The reaction was carried out at from 65 to 70° C. An aliquot of the reaction solution was taken and its IR spectrum was determined to follow the reaction. After confirming that the elimination quantity reached a given quantity, the reaction system was rapidly cooled in an ice bath, and the reaction solution was poured into excess amounts of water to precipitate a polymer. After filtrating and washing, drying with reduced pressure at 70° C. for 5 hours afforded 7.0 g of a white powder polymer.

The GPC analysis of this polymer showed that it was a monodisperse polymer with Mn of 43500 and Mw/Mn of 1.15. The ratio of para-hydroxystyrene (PHS) unit/PTBST unit obtained by NMR was 0.88/0.12 (molar ratio).

Consequently, it could be confirmed that the copolymerization reaction and the elimination reaction were carried out as being set and that the alkenylphenol star polymer in which a random copolymer of p-hydroxystyrene and styrene is a main skeleton was generated.

INDUSTRIAL APPLICABILITY

The star block copolymer having an arm moiety of alkenylphenol moiety can be obtained by the present invention of which molecular weight distribution is narrow, the structure is controlled and utilization is anticipated as a resist material for excimer lasers and electron beams.

What is claimed is:
1. A star block copolymer characterized in that an arm moiety (A) comprises a polymer chain (A1) consisting of only a repeated unit represented by the general formula (I):

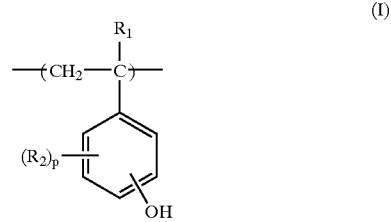

wherein $R_1$ represents a hydrogen atom or a methyl group; $R_2$ represents a hydrogen atom or a C1 through C6 alkyl group; and p represents 1 or 2 wherein $R_2$ may be identical or different when p is 2, in the star block copolymer having the arm moiety composed of a central core and polymer chains extending from the central core;

or having a repeated unit represented by one of the general formulae (I) and (II):

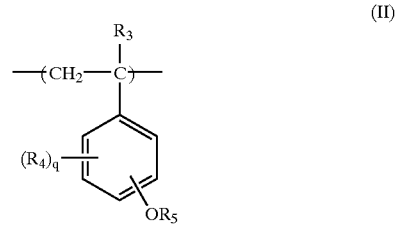

wherein $R_3$ represents a hydrogen atom or a methyl group; $R_4$ represents a C1 through C6 alkyl group; $R_5$ represents an acidolytic/leaving group; q represents 0, 1 or 2 wherein $R_4$ may be identical or different when q is 2;

the general formulae (I) and (III):

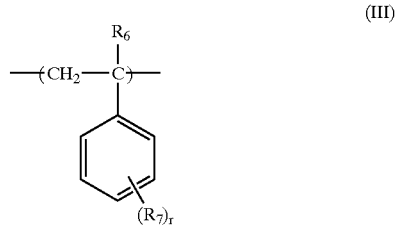

wherein $R_6$ represents a hydrogen atom, a methyl group or an aryl group which may have substituents; $R_7$ represents a C1 through C6 alkyl group; r represents 0, 1 or 2 wherein $R_7$ may be identical or different when r is 2; and the general formulae (I), (II) and (III):

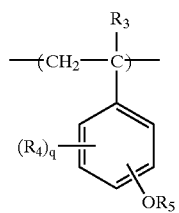

(II)

wherein $R_3$, $R_4$, $R_5$, and q are the same as mentioned above.

2. The star block copolymer according to claim 1, characterized in that the arm moiety (A) has the polymer chain (A1) and a polymer chain (A2) having repeated units (A21) represented by one of:
the general formula (IV):

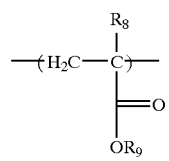

(IV)

wherein $R_8$ represents a hydrogen atom or a methyl group; and $R_9$ represents a hydrogen atom, a C1 through C12 alkyl group, a hydrocarbon group having alicyclic skeletons of C3 or more which may have substituents, an alkyl group having hydrocarbon groups having the alicyclic skeletons, or a heterocyclic group; and
the general formula (IV) and repeated units (A22) represented by the general formula (V):

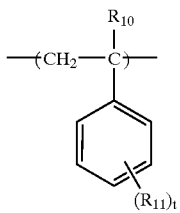

(V)

wherein $R_{10}$ is a hydrogen atom, a methyl group, or an aryl group which may have substituents; $R_{11}$ represents a C1 through C6 alkyl group, or $OR_{12}$ group wherein $R_{12}$ represents a hydrogen atom, a C1 through C6 alkyl group, or an acidolytic/leaving group; and t represents an integer of 0 or from 1 through 3 wherein $R_{11}$ may be identical or different when t is 2 or more.

3. The star block copolymer according to claim 2, characterized in that the polymer chain (A2) is a block copolymerized by (A22) through (A21) sequentially from the central core.

4. The star block copolymer according to claim 1, characterized in that the number average molecular weight of the polymer chains constituting the arm moiety is from 1,000 to 100,000 and the ratio (Mw/Mn) of the weight average molecular weight(Mw) to the number average molecular weight(Mn) is in the range of from 1.00 to 1.50.

5. The star block copolymer according to claim 1, characterized in that the central core is a core crosslinked with a polyfunctional coupling agent.

6. The star block copolymer according to claim 5, characterized in that the polyfunctional coupling agent is a compound having at least two polymerization double bonds per molecule.

7. The star block copolymer according to claim 5, characterized in that the polyfunctional coupling agent is a compound represented by the general formula (VI):

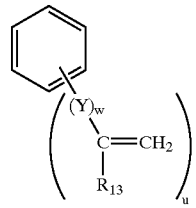

(VI)

wherein $R_{13}$ represents a hydrogen atom or a methyl group; Y represents an oxygen atom, a sulfur atom, $R_{16}N$ wherein $R_{16}$ represents a hydrogen atom, C1 through C6 alkyl groups, or alkoxycarbonyl groups, a methylene group which may have substituents, a phenylene group which may have substituents, $C(R_{18}R_{19})O$, $C(R_{18}R_{19})S$, $C(R_{18}R_{19})N(R_{20})$, $OC(R_{18}R_{19})$, $SC(R_{18}R_{19})$, $N(R_{20})C(R_{18}R_{19})$ wherein $R_{18}$, $R_{19}$, and $R_{20}$ represent C1 through C6 alkyl groups, or phenyl groups which may have substituents, OCO or $CO_2CH_2$; w represents an integer of 0 or from 1 to 2 wherein Y may be identical or different when w is 2; and u represents 2 or 3 wherein Y, $R_{13}$ and w may be identical or different.

8. The star block copolymer according to claim 1, characterized in that the number average molecular weight is from 3,000 to 200,000.

9. A process for producing the star block copolymer according to claim 1, characterized in that by anionic polymerization using an anionic polymerization initiator as a polymerization initiator, after a compound represented by the general formula (VII):

$$\begin{array}{c} R_3 \\ CH_2{=}C \\ \end{array}$$

(VII)

(with $(R_4)_q$ and $OR_5$ on the phenyl ring)

wherein $R_3$, $R_4$, $R_5$ and q are the same as mentioned above is homopolymerized or after the compound represented by the general formula (VII) and a compound capable of copolymerizing are copolymerized, further a polyfunctional coupling agent (C) is copolymerized, and then protective groups of phenol hydroxyl groups are eliminated.

10. The process for producing the star block copolymer according to claim 9, characterized in that the molar ratio is from 0.1 to 10 of the polyfunctional coupling agent (C) to an active end of the polymer chain homopolymerizing the compound represented by the general formula (VII) or an active end (D) of the polymer chain copolymerizing a compound capable of copolymerizing with the compound represented by the general formula (VII) by anionic polymerization using an anionic polymerization initiator as a polymerization initiator.

11. The process for producing the star block copolymer according to claim 9, characterized in that the polyfunctional coupling agent is a compound represented by the general formula (VI):

the general formula (I):

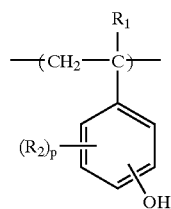

(I)

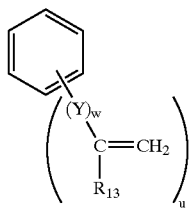

(VI)

wherein R$_{13}$ represents a hydrogen atom or a methyl group; Y represents an oxygen atom, a sulfur atom, R$_{16}$N wherein R$_{16}$ represents a hydrogen atom, C1 through C6 alkyl groups, or alkoxycarbonyl groups, a methylene group which may have substituents, a phenylene group which may have substituents, C(R$_{18}$R$_{19}$)O, C(R$_{18}$R$_{19}$)S, C(R$_{18}$R$_{19}$)N(R$_{20}$), OC(R$_{18}$R$_{19}$), SC(R$_{18}$R$_{19}$), N(R$_{20}$)C(R$_{18}$R$_{19}$) wherein R$_{18}$, R$_{19}$, and R$_{20}$ represent C1 through C6 alkyl groups, or phenyl groups which may have substituents, OCO or CO$_2$CH$_2$; w represents an integer of 0 or from 1 to 2 wherein Y may be identical or different when w is 2: and u represents 2 or 3 wherein Y, R$_{13}$ and w may be identical or different.

12. The process for producing the star block copolymer according to claim 9, characterized in that the compound capable of copolymerizing with the compound represented by the general formula (VII) is a compound represented by the general formula (VIII):

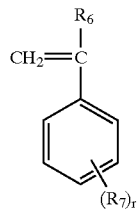

(VIII)

wherein R$_6$, R$_7$, and r are the same as mentioned above.

13. The process for producing the star block copolymer according to claim 9, characterized in that the compound capable of anion polymerizing is a compound represented by the general formula (IX):

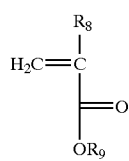

(IX)

wherein R$_8$ and R$_9$ are the same as mentioned above.

14. A star block copolymer characterized in that an arm moiety (A) comprises a polymer chain (A1) having a repeated unit represented by one of wherein R$_1$ represents a hydrogen atom or a methyl group; R$_2$ represents a hydrogen atom or a C1 through C6 alkyl group; and p represents 1 or 2 wherein R$_2$ may be identical or different when p is 2, in the star block copolymer having the arm moiety composed of a central core and polymer chains extending from the central core;

the general formulae (I) and (II):

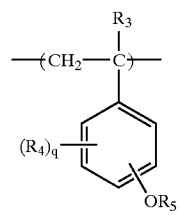

(II)

wherein R$_3$ represents a hydrogen atom or a methyl group; R$_4$ represents a C1 through C6 alkyl group; R$_5$ represents an acidolytic/leaving group; q represents 0, 1 or 2 wherein R$_4$ may be identical or different when q is 2;

the general formulae (I) and (III):

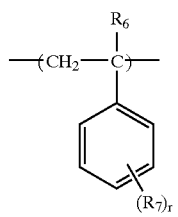

(III)

wherein R$_6$ represents a hydrogen atom, a methyl group or an aryl group which may have substituents; R$_7$ represents a C1 through C6 alkyl group; r represents 0, 1 or 2 wherein R$_7$ may be identical or different when r is 2; and the general formulae (I), (II) and (III):

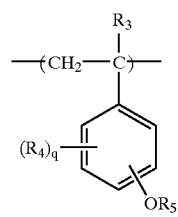

(II)

wherein R$_3$, R$_4$, R$_5$, and q are the same as mentioned above, and wherein the arm moiety (A) has the polymer chain (A1) and a polymer chain (A2) having repeated units (A21) represented by one of:

the general formula (IV):

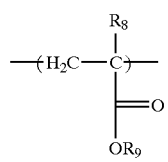
(IV)

wherein $R_8$ represents a hydrogen atom or a methyl group; and $R_9$ represents a hydrogen atom, a C1 through C12 alkyl group, a hydrocarbon group having alicyclic skeletons of C3 or more which may have substituents, an alkyl group having hydrocarbon groups having the alicyclic skeletons, or a heterocyclic group; and the general formula (IV) and repeated units (A22) represented by the general formula (V):

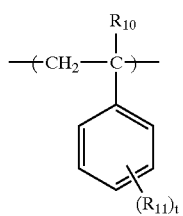
(V)

wherein $R_{10}$ is a hydrogen atom, a methyl group, or an aryl group which may have substituents; $R_{11}$ represents a C1 through C6 alkyl group, or $OR_{12}$ group wherein $R_{12}$ represents a hydrogen atom, a C1 through C6 alkyl group, or an acidolytic/leaving group; and t represents an integer of 0 or from 1 through 3 wherein $R_{11}$ may be identical or different when t is 2 or more.

15. The star block copolymer according to claim 14, characterized in that the polymer chain (A2) is a block copolymerized by (A22) through (A21) sequentially from the central core.

16. The star block copolymer according to claim 14, characterized in that the number average molecular weight of the polymer chains constituting the arm moiety is from 1,000 to 100,000 and the ratio (Mw/Mn) of the weight average molecular weight(Mw) to the number average molecular weight(Mn) is in the range of from 1.00 to 1.50.

17. The star block copolymer according to claim 14, characterized in that the central core is a core crosslinked with a polyfunctional coupling agent.

18. The star block copolymer according to claim 17, characterized in that the polyfunctional coupling agent is a compound having at least two polymerization double bonds per molecule.

19. The star block copolymer according to claim 17, characterized in that the polyfunctional coupling agent is a compound represented by the general formula (VI):

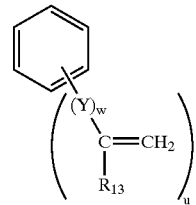
(VI)

wherein $R_{13}$ represents a hydrogen atom or a methyl group; Y represents an oxygen atom, a sulfur atom, $R_{16}N$ wherein $R_{16}$ represents a hydrogen atom, C1 through C6 alkyl groups, or alkoxycarbonyl groups, a methylene group which may have substituents, a phenylene group which may have substituents, $C(R_{18}R_{19})O$, $C(R_{18}R_{19})S$, $C(R_{18}R_{19})N(R_{20})$, $OC(R_{18}R_{19})$, $SC(R_{18}R_{19})$, $N(R_{20})C(R_{18}R_{19})$ wherein $R_{18}$, $R_{19}$, and $R_{20}$ represent C1 through C6 alkyl groups, or phenyl groups which may have substituents, OCO or $CO_2CH_2$; w represents an integer of 0 or from 1 to 2 wherein Y may be identical or different when w is 2; and u represents 2 or 3 wherein Y, $R_{13}$ and w may be identical or different.

20. The star block copolymer according to claim 14, characterized in that the number average molecular weight is from 3,000 to 200,000.

21. A process for producing the star block copolymer according to claim 14, characterized in that by anionic polymerization using an anionic polymerization initiator as a polymerization initiator, after a compound represented by the general formula (VI):

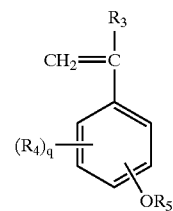
(VII)

wherein $R_3$, $R_4$, $R_5$ and q are the same as mentioned above is homopolymerized or after the compound represented by the general formula (VII) and a compound capable of copolymerizing are copolymerized, further a polyfunctional coupling agent (C) is copolymerized, and then protective groups of phenol hydroxyl groups are eliminated.

22. The process for producing the star block copolymer according to claim 21, characterized in that the molar ratio is from 0.1 to 10 of the polyfunctional coupling agent (C) to an active end of the polymer chain homopolymerizing the compound represented by the general formula (VII) or an active end (D) of the polymer chain copolymerizing a compound capable of copolymerizing with the compound represented by the general formula (VII) by anionic polymerization using an anionic polymerization initiator as a polymerization initiator.

23. The process for producing the star block copolymer according to claim 21, characterized in that the polyfunctional coupling agent is a compound represented by the general formula (VI):

(VI)

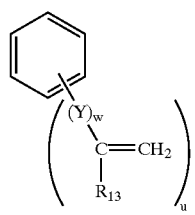

wherein $R_{13}$ represents a hydrogen atom or a methyl group; Y represents an oxygen atom, a sulfur atom, $R_{16}N$ wherein $R_{16}$ represents a hydrogen atom, C1 through C6 alkyl groups, or alkoxycarbonyl groups, a methylene group which may have substituents, a phenylene group which may have substituents, $C(R_{18}R_{19})O$, $C(R_{18}R_{19})S$, $C(R_{18}R_{19})N(R_{20})$, $OC(R_{18}R_{19})$, $SC(R_{18}R_{19})$, $N(R_{20})C(R_{18}R_{19})$ wherein $R_{18}$ $R_{19}$ and $R_{20}$ represent C1 through C6 alkyl groups, or phenyl groups which may have substituents, OCO or $CO_2CH_2$; w represents an integer of 0 or from 1 to 2 wherein Y may be identical or different when w is 2; and u represents 2 or 3 wherein Y, $R_{13}$ and w may be identical or different.

24. The process for producing the star block copolymer according to claim 21, characterized in that the compound capable of copolymerizing with the compound represented by the general formula (VII) is a compound represented by the general formula (VIII):

(VIII)

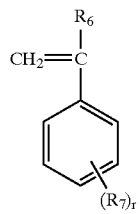

wherein $R_6$, $R_7$, and r are the same as mentioned above.

25. The process for producing the star block copolymer according to claim 21, characterized in that the compound capable of anion polymerizing is a compound represented by the general formula (IX):

(IX)

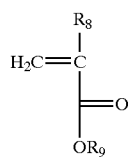

wherein $R_8$ and $R_9$ are the same as mentioned above.

26. A star block copolymer characterized in that an arm moiety (A) comprises a polymer chain (A1) having a repeated unit represented by one of the general formula (I):

(I)

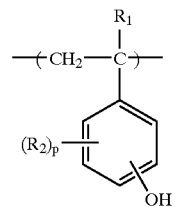

wherein $R_1$ represents a hydrogen atom or a methyl group; $R_2$ represents a hydrogen atom or a C1 through C6 alkyl group; and p represents 1 or 2 wherein $R_2$ may be identical or different when p is 2, in the star block copolymer having the arm moiety composed of a central core and polymer chains extending from the central core;

the general formulae (I) and (II):

(II)

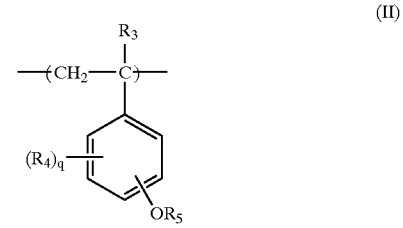

wherein $R_3$ represents a hydrogen atom or a methyl group; $R_4$ represents a C1 through C6 alkyl group; $R_5$ represents an acidolytic/leaving group; q represents 0, 1 or 2 wherein $R_4$ may be identical or different when q is 2;

the general formulae (I) and (III):

(III)

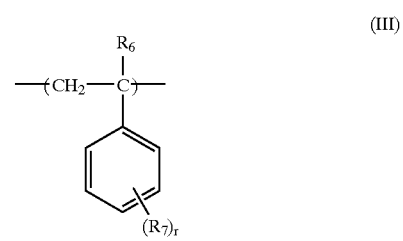

wherein $R_6$ represents a hydrogen atom, a methyl group or an aryl group which may have substituents; $R_7$ represents a C1 through C6 alkyl group; r represents 0, 1 or 2 wherein $R_7$ may be identical or different when r is 2; and the general formulae (I), (II) and (III):

(II)

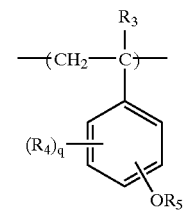

wherein $R_3$, $R_4$, $R_5$, and q are the same as mentioned above, characterized in that by anionic polymerization using an anionic polymerization initiator as a polymerization initiator, after a compound represented by the general formula (VII):

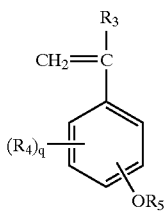

(VII)

wherein $R_3$, $R_4$, $R_5$ and q are the same as mentioned above is homopolymerized or after the compound represented by the general formula (VII) and a compound capable of copolymerizing are copolymerized, further a polyfunctional coupling agent (C) is copolymerized, and then protective groups of phenol hydroxyl groups are eliminated.

27. The star block copolymer according to claim 26, characterized in that the arm moiety (A) has the polymer chain (A1) and a polymer chain (A2) having repeated units (A21) represented by one of:
the general formula (IV):

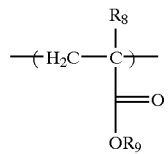

(IV)

wherein $R_8$ represents a hydrogen atom or a methyl group; and $R_9$ represents a hydrogen atom, a C1 through C12 alkyl group, a hydrocarbon group having alicyclic skeletons of C3 or more which may have substituents, an alkyl group having hydrocarbon groups having the alicyclic skeletons, or a heterocyclic group; and
the general formula (IV) and repeated units (A22) represented by the general formula (V):

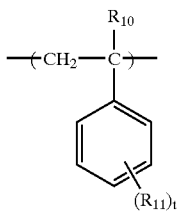

(V)

wherein $R_{10}$ is a hydrogen atom, a methyl group, or an aryl group which may have substituents; $R_{11}$ represents a C1 through C6 alkyl group, or $OR_{12}$ group wherein $R_{12}$ represents a hydrogen atom, a C1 through C6 alkyl group, or an acidolytic/leaving group; and t represents an integer of 0 or from 1 through 3 wherein $R_{11}$ may be identical or different when t is 2 or more.

28. The star block copolymer according to claim 27, characterized in that the polymer chain (A2) is a block copolymerized by (A22) through (A21) sequentially from the central core.

29. The star block copolymer according to claim 26, characterized in that the number average molecular weight of the polymer chains constituting the arm moiety is from 1,000 to 100,000 and the ratio (Mw/Mn) of the weight average molecular weight(Mw) to the number average molecular weight(Mn) is in the range of from 1.00 to 1.50.

30. The star block copolymer according to claim 26, characterized in that the central core is a core crosslinked with a polyfunctional coupling agent.

31. The star block copolymer according to claim 30, characterized in that the polyfunctional coupling agent is a compound having at least two polymerization double bonds per molecule.

32. The star block copolymer according to claim 30, characterized in that the polyfunctional coupling agent is a compound represented by the general formula (VI):

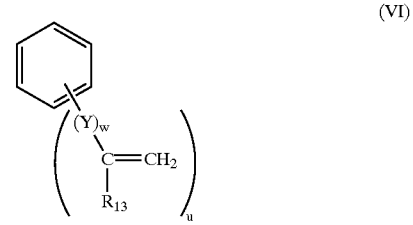

(VI)

wherein $R_{13}$ represents a hydrogen atom or a methyl group; Y represents an oxygen atom, a sulfur atom, $R_{16}N$ wherein $R_{16}$ represents a hydrogen atom, C1 through C6 alkyl groups, or alkoxycarbonyl groups, a methylene group which may have substituents, a phenylene group which may have substituents, $C(R_{18}R_{19})O$, $C(R_{18}R_{19})S$, $C(R_{18}R_{19})N(R_{20})$, $OC(R_{18}R_{19})$, $SC(R_{18}R_{19})$, $N(R_{20})C(R_{18}R_{19})$ wherein $R_{18}$, $R_{19}$, and $R_{20}$ represent C1 through C6 alkyl groups, or phenyl groups which may have substituents, OCO or $CO_2CH_2$; w represents an integer of 0 or from 1 to 2 wherein Y may be identical or different when w is 2; and u represents 2 or 3 wherein Y, $R_{13}$ and w may be identical or different.

33. The star block copolymer according to claim 26, characterized in that the number average molecular weight is from 3,000 to 200,000.

34. The process for producing the star block copolymer according to claim 26, characterized in that the molar ratio is from 0.1 to 10 of the polyfunctional coupling agent (C) to an active end of the polymer chain homopolymerizing the compound represented by the general formula (VII) or an active end (D) of the polymer chain copolymerizing a compound capable of copolymerizing with the compound represented by the general formula (VII) by anionic polymerization using an anionic polymerization initiator as a polymerization initiator.

35. The process for producing the star block copolymer according to claim 26, characterized in that the polyfunctional coupling agent is a compound represented by the general formula (VI):

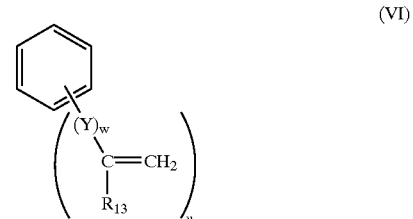

(VI)

wherein $R_{13}$ represents a hydrogen atom or a methyl group; Y represents an oxygen atom, a sulfur atom, $R_{16}N$ wherein $R_{16}$ represents a hydrogen atom, C1 through C6 alkyl groups, or alkoxycarbonyl groups, a methylene group which may have substituents, a phenylene group which may have substituents, $C(R_{18}R_{19})O$, $C(R_{18}R_{19})S$, $C(R_{18}R_{19})N(R_{20})$, $OC(R_{18}R_{19})$, $SC(R_{18}R_{19})$, $N(R_{20})C(R_{18}R_{19})$ wherein $R_{18}$, $R_{19}$, and $R_{20}$ represent C1 through C6 alkyl groups, or phenyl groups which may have substituents, OCO or $CO_2CH_2$; w represents an integer of 0 or from 1 to 2 wherein Y may be identical or different when w is 2; and u represents 2 or 3 wherein Y, $R_{13}$ and w may be identical or different.

36. The process for producing the star block copolymer according to claim 26, characterized in that the compound capable of copolymerizing with the compound represented by the general formula (VII) is a compound represented by the general formula (VIII):

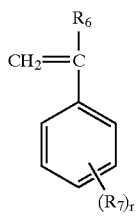

(VIII)

wherein $R_6$, $R_7$, and r are the same as mentioned above.

37. The process for producing the star block copolymer according to claim 26, characterized in that the compound capable of anion polymerizing is a compound represented by the general formula (IX):

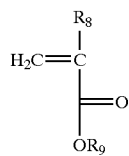

(IX)

wherein $R_8$ and $R_9$ are the same as mentioned above.

38. A star block copolymer characterized in that an arm moiety (A) comprises a polymer chain (A1) having a repeated unit represented by one of the general formula (I):

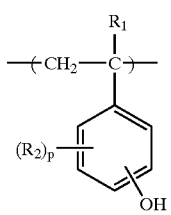

(I)

wherein $R_1$ represents a hydrogen atom or a methyl group; $R_2$ represents a hydrogen atom or a C1 through C6 alkyl group; and p represents 1 or 2 wherein $R_2$ may be identical or different when p is 2, in the star block copolymer having the arm moiety composed of a central core and polymer chains extending from the central core;

the general formulae (I) and (II):

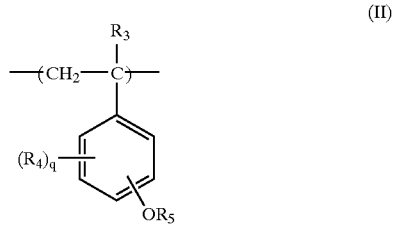

(II)

wherein $R_3$ represents a hydrogen atom or a methyl group; $R_4$ represents a C1 through C6 alkyl group; $R_5$ represents an acidolytic/leaving group; q represents 0, 1 or 2 wherein $R_4$ may be identical or different when q is 2;

the general formulae (I) and (III):

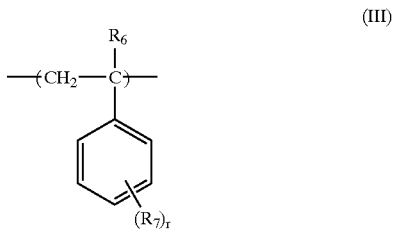

(III)

wherein $R_6$ represents a hydrogen atom, a methyl group or an aryl group which may have substituents; $R_7$ represents a C1 through C6 alkyl group; r represents 0, 1 or 2 wherein $R_7$ may be identical or different when r is 2; and the general formulae (I), (II) and (III):

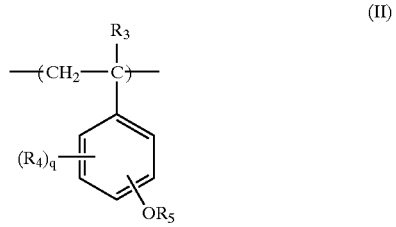

(II)

wherein $R_3$, $R_4$, $R_5$, and q are the same as mentioned above, and wherein the central core is a core crosslinked with a polyfunctional coupling agent.

39. The star block copolymer according to claim 38, characterized in that the arm moiety (A) has the polymer chain (A1) and a polymer chain (A2) having repeated units (A21) represented by one of:

the general formula (IV):

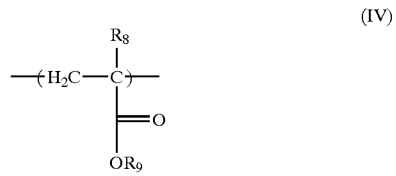

(IV)

wherein $R_8$ represents a hydrogen atom or a methyl group; and $R_9$ represents a hydrogen atom, a C1 through C12 alkyl group, a hydrocarbon group having alicyclic skeletons of C3 or more which may have substituents, an alkyl group having hydrocarbon groups having the alicyclic skeletons, or a heterocyclic group; and the general formula (IV) and repeated units (A22) represented by the general formula (V):

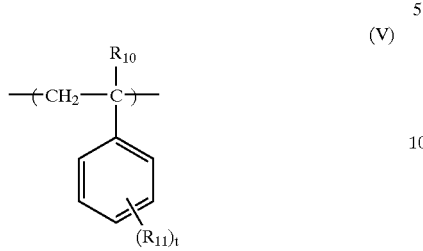

wherein $R_{10}$ is a hydrogen atom, a methyl group, or an aryl group which may have substituents; $R_{11}$ represents a C1 through C6 alkyl group, or $OR_{12}$ group wherein $R_{12}$ represents a hydrogen atom, a C1 through C6 alkyl group, or an acidolytic/leaving group; and t represents an integer of 0 or from 1 through 3 wherein $R_{11}$ may be identical or different when t is 2 or more.

40. The star block copolymer according to claim 39, characterized in that the polymer chain (A2) is a block copolymerized by (A22) through (A21) sequentially from the central core.

41. The star block copolymer according to claim 38, characterized in that the number average molecular weight of the polymer chains constituting the arm moiety is from 1,000 to 100,000 and the ratio (Mw/Mn) of the weight average molecular weight(Mw) to the number average molecular weight(Mn) is in the range of from 1.00 to 1.50.

42. The star block copolymer according to claim 38, characterized in that the polyfunctional coupling agent is a compound having at least two polymerization double bonds per molecule.

43. The star block copolymer according to claim 38, characterized in that the polyfunctional coupling agent is a compound represented by the general formula (VI):

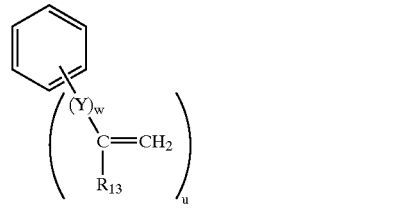

wherein $R_{13}$ represents a hydrogen atom or a methyl group; Y represents an oxygen atom, a sulfur atom, $R_{16}N$ wherein $R_{16}$ represents a hydrogen atom, C1 through C6 alkyl groups, or alkoxycarbonyl groups, a methylene group which may have substituents, a phenylene group which may have substituents, $C(R_{18}R_{19})O$, $C(R_{18}R_{19})S$, $C(R_{18}R_{19})N(R_{20})$, $OC(R_{18}R_{19})$, $SC(R_{18}R_{19})$, $N(R_{20})C(R_{18}R_{19})$ wherein $R_{18}$, $R_{18}$, and $R_{20}$ represent C1 through C6 alkyl groups, or phenyl groups which may have substituents, OCO or $CO_2CH_2$; w represents an integer of 0 or from 1 to 2 wherein Y may be identical or different when w is 2; and u represents 2 or 3 wherein Y, $R_{13}$ and w may be identical or different.

44. The star block copolymer according to claim 38, characterized in that the number average molecular weight is from 3,000 to 200,000.

45. A process for producing the star block copolymer according to claim 38, characterized in that by anionic polymerization using an anionic polymerization initiator as a polymerization initiator, after a compound represented by the general formula (VII):

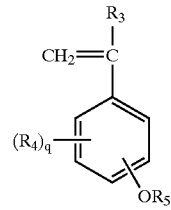

wherein $R_3$, $R_4$, $R_5$ and q are the same as mentioned above is homopolymerized or after the compound represented by the general formula (VII) and a compound capable of copolymerizing are copolymerized, further a polyfunctional coupling agent (C) is copolymerized, and then protective groups of phenol hydroxyl groups are eliminated.

46. The process for producing the star block copolymer according to claim 45, characterized in that the molar ratio is from 0.1 to 10 of the polyfunctional coupling agent (C) to an active end of the polymer chain homopolymerizing the compound represented by the general formula (VII) or an active end (D) of the polymer chain copolymerizing a compound capable of copolymerizing with the compound represented by the general formula (VII) by anionic polymerization using an anionic polymerization initiator as a polymerization initiator.

47. The process for producing the star block copolymer according to claim 45, characterized in that the polyfunctional coupling agent is a compound represented by the general formula (VI):

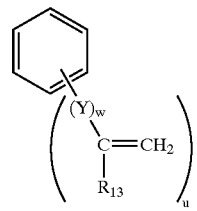

wherein $R_{13}$ represents a hydrogen atom or a methyl group; Y represents an oxygen atom, a sulfur atom, $R_{16}N$ wherein $R_{16}$ represents a hydrogen atom, C1 through C6 alkyl groups or alkoxycarbonyl groups, a methylene group which may have substituents, a phenylene group which may have substituents, $C(R_{18}R_{19})O$, $C(R_{18}R_{19})S$, $C(R_{18}R_{19})N(R_{20})$, $OC(R_{18}R_{19})$, $SC(R_{18}R_{19})$, $N(R_{20})C(R_{18}R_{19})$ wherein $R_{18}$, $R_{19}$ and $R_{20}$ represent C1 through C6 groups, or phenyl groups which may have substituents, OCO or $CO_2CH_2$; w represents an integer of 0 or from 1 to 2 wherein Y may be identical or different when w is 2; and u represents 2 or 3 wherein Y, $R_{13}$ and w may be identical or different.

48. The process for producing the star block copolymer according to claim 45, characterized in that the compound capable of copolymerizing with the compound represented by the general formula (VII) is a compound represented by the general formula (VIII):

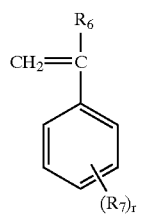 (VIII)
wherein $R_6$, $R_7$, and r are the same as mentioned above.
49. The process for producing the star block copolymer according to claim 45, caracterized in that the compound capable of anion polymerizing is a compound represented by the general formula (IX):
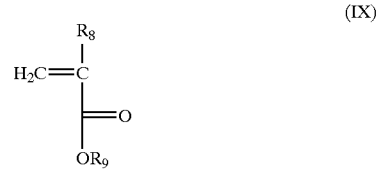 (IX)
wherein $R_8$ and $R_9$ are the same as mentioned above.
* * * * *

UNITED STATES PATENT AND TRADEMARK OFFICE
CERTIFICATE OF CORRECTION

PATENT NO.   : 6,713,564 B1
DATED        : March 30, 2004
INVENTOR(S)  : Yukikazu Nobuhara et al.

It is certified that error appears in the above-identified patent and that said Letters Patent is hereby corrected as shown below:

Title page,
Item [75], Inventors, replace "Nakamura Mitsuhiro" with -- Mitsuhiro Nakamura --.

Column 5,
Line 61, replace "and $R_2 0$ represent" with -- and $R_{20}$ represent --.

Column 9,
Line 42, replace "third line of formula chain" with

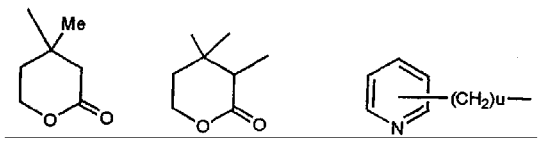

Column 10,
Line 41, replace "$R_{13}$" with -- $R_{11}$ --.

Column 34,
Line 33, replace "the general formula (VI)" with -- the general formula (VII) --.
Line 54, replace "the molar ratio" with -- the molar ratio [(C)/(D)] --.

Column 38,
Line 37, replace "the molar ratio" with -- the molar ratio [(C)/(D)] --.

Column 42,
Line 24, replace "the molar ratio" with -- the molar ratio [(C)/(D)] --.

Signed and Sealed this

Twentieth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,713,564 B1
DATED : March 30, 2004
INVENTOR(S) : Yukikazu Nobuhara et al.

It is certified that error appears in the above-identified patent and that said Letters Patent is hereby corrected as shown below:

Column 30,
Line 55, replace "the molar ratio" with -- the molar ratio [(C )/(D)] --.

Signed and Sealed this

Fifteenth Day of March, 2005

JON W. DUDAS
*Director of the United States Patent and Trademark Office*